(12) United States Patent
Kim et al.

(10) Patent No.: US 10,078,365 B2
(45) Date of Patent: Sep. 18, 2018

(54) DEVICE FOR CONTROLLING MOBILE TERMINAL AND METHOD OF CONTROLLING THE MOBILE TERMINAL

(71) Applicant: LG ELECTRONICS INC., Seoul (KR)

(72) Inventors: Byoungeul Kim, Seoul (KR); Yehan Ahn, Seoul (KR); Yeongkyu Lim, Seoul (KR); Sungho Woo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 239 days.

(21) Appl. No.: 14/782,566

(22) PCT Filed: Nov. 21, 2013

(86) PCT No.: PCT/KR2013/010619
§ 371 (c)(1),
(2) Date: Oct. 5, 2015

(87) PCT Pub. No.: WO2014/171606
PCT Pub. Date: Oct. 23, 2014

(65) Prior Publication Data
US 2016/0070338 A1 Mar. 10, 2016

(30) Foreign Application Priority Data

Apr. 19, 2013 (KR) .......................... 10-2013-0043688
Jun. 26, 2013 (KR) .......................... 10-2013-0073884

(51) Int. Cl.
*G06F 3/041* (2006.01)
*G06F 3/01* (2006.01)
*G06F 3/0488* (2013.01)

(52) U.S. Cl.
CPC .............. *G06F 3/01* (2013.01); *G06F 3/0412* (2013.01); *G06F 3/0416* (2013.01); *G06F 3/0488* (2013.01)

(58) Field of Classification Search
None
See application file for complete search history.

(56) References Cited

U.S. PATENT DOCUMENTS

| 2009/0174679 A1 | 7/2009 | Westerman |
| 2010/0079395 A1* | 4/2010 | Kim ...................... G06F 1/1626 345/173 |

(Continued)

OTHER PUBLICATIONS

PCT International Application No. PCT/KR2013/010619, Written Opinion of the International Searching Authority dated Feb. 27, 2014, 1 page.

*Primary Examiner* — Carolyn R Edwards
*Assistant Examiner* — Bipin Gyawali
(74) *Attorney, Agent, or Firm* — Lee, Hong, Degerman, Kang & Waimey

(57) ABSTRACT

Disclosed is a device for controlling a mobile terminal, including a touch sensor that detects a touch input with respect to a specific region of a touch screen, and a controller that determines whether the touch input continues to be received for reference time for which a state in which the mobile terminal is gripped by a user is recognized and that, when the touch input continues to be received for the reference time, blocks touch information corresponding to the touch input.

16 Claims, 25 Drawing Sheets

(56) References Cited

U.S. PATENT DOCUMENTS

| | | | |
|---|---|---|---|
| 2010/0259504 A1* | 10/2010 | Doi | G06F 3/0418 |
| | | | 345/174 |
| 2011/0069021 A1 | 3/2011 | Hill | |
| 2012/0287076 A1 | 11/2012 | Dao et al. | |
| 2013/0009915 A1 | 1/2013 | Hering | |
| 2013/0021269 A1 | 1/2013 | Johnson et al. | |
| 2013/0222286 A1* | 8/2013 | Kang | G06F 3/041 |
| | | | 345/173 |
| 2013/0278543 A1* | 10/2013 | Hsu | G06F 3/044 |
| | | | 345/174 |
| 2013/0321340 A1* | 12/2013 | Seo | G06F 1/1641 |
| | | | 345/174 |

* cited by examiner

DEVICE FOR CONTROLLING MOBILE TERMINAL AND METHOD OF CONTROLLING THE MOBILE TERMINAL

CROSS-REFERENCE TO RELATED APPLICATIONS

This application is the National Stage filing under 35 U.S.C. 371 of International Application No. PCT/KR2013/010619, filed on Nov. 21, 2013, which claims the benefit of earlier filing date and right of priority to Korean Application Nos. 10-2013-0043688, filed on Apr. 19, 2013, and 10-2013-0073884, filed on Jun. 26, 2013, the contents of which are all hereby incorporated by reference herein in their entirety.

TECHNICAL FIELD

The present invention relates to a device for controlling a mobile terminal and a method of controlling the mobile terminal.

BACKGROUND ART

Generally, a touch screen of the mobile terminal refers to an input device in which contact with a button applied and displayed on the display makes operation of a device possible. That is, the touch screen refers to a display device that is designed such that when the user brings his/her finger or a pen-shaped touch tool into direct contact with the touch screen, a device equipped with the touch screen recognizes the region on which the contact occurs and accordingly executes a corresponding command or moves a position of a cursor. The touch screen is widely used in the mobile terminal such as a mobile phone because it does not separately require space in which a key input unit is formed.

DISCLOSURE OF INVENTION

Solution to Problem

Generally, a touch screen of the mobile terminal refers to an input device in which contact with a button applied and displayed on the display makes operation of a device possible. That is, the touch screen refers to a display device that is designed such that when the user brings his/her finger or a pen-shaped touch tool into direct contact with the touch screen, a device equipped with the touch screen recognizes the region on which the contact occurs and accordingly executes a corresponding command or moves a position of a cursor. The touch screen is widely used in the mobile terminal such as a mobile phone because it does not separately require space in which a key input unit is formed.

BEST MODE FOR CARRYING OUT THE INVENTION

Figure 1:
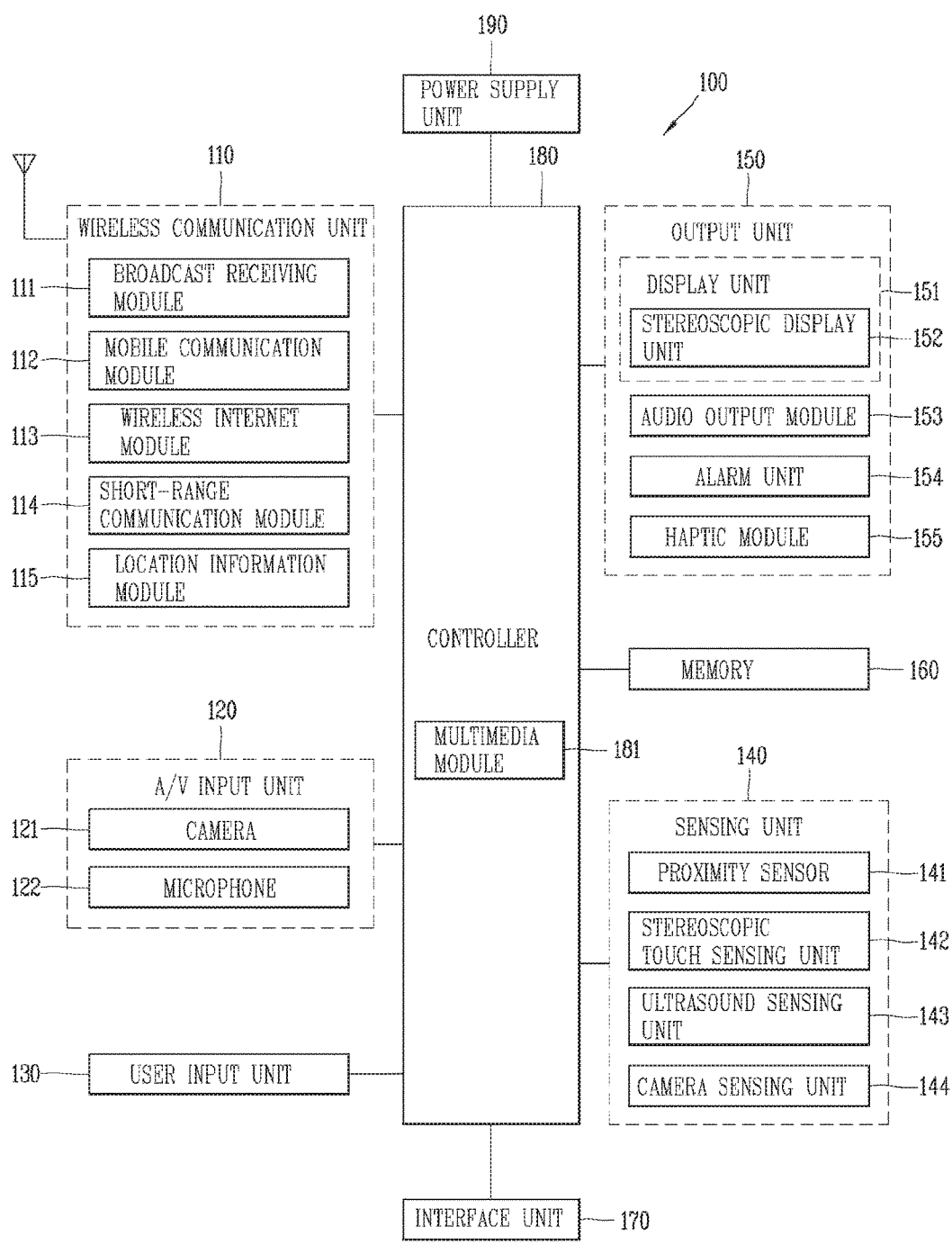
FIG. 1 is a block diagram illustrating a mobile terminal according to embodiments of the present invention.

The technical terms used in the present specification are set forth to mention specific embodiments of the present invention, and do not intend to define the scope of the present invention. As far as not being defined differently, all terms used herein including technical or scientific terms may have the same meaning as those generally understood by an ordinary person skilled in the art to which the present disclosure belongs to, and should not be construed in an excessively comprehensive meaning or an excessively restricted meaning. In addition, if a technical term used in the description of the present disclosure is an erroneous term that fails to clearly express the idea of the present disclosure, it should be replaced by a technical term that can be properly understood by the skilled person in the art. In addition, general terms used in the description of the present disclosure should be construed according to definitions in dictionaries or according to its front or rear context, and should not be construed to have an excessively restrained meaning.

A singular representation may include a plural representation as far as it represents a definitely different meaning from the context. Terms 'include' or 'has' used herein should be understood that they are intended to indicate an existence of several components or several steps, disclosed in the specification, and it may also be understood that part of the components or steps may not be included or additional components or steps may further be included.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

Preferred embodiments of the present invention will be described below in detail with reference to the accompanying drawings where those components are rendered the same reference number that are the same or are in correspondence, regardless of the figure number, and redundant explanations are omitted.

In describing the present invention, if a detailed explanation for a related known function or construction is considered to unnecessarily divert the gist of the present invention, such explanation has been omitted but would be understood by those skilled in the art. The accompanying drawings are used to help easily understood the technical idea of the present invention and it should be understood that the idea of the present invention is not limited by the accompanying drawings.

A mobile terminal in this specification may include a portable phone, a mart phone, a laptop computer, a digital broadcasting terminal, a personal digital assistant (PDA), a portable multimedia player (PMP), a navigation, a slate PC, a table PC, an ultrabook, etc.

FIG. 1 is a block diagram of a mobile terminal 100 in accordance with one exemplary embodiment.

The mobile terminal 100 may comprise components, such as a wireless communication unit 110, an Audio/Video (A/V) input unit 120, a user input unit 130, a sensing unit 140, an output unit 150, a memory 160, an interface unit 170, a controller 180, a power supply 190 and the like. FIG. 1B shows the mobile terminal 100 having various components, but it is understood that implementing all of the illustrated components is not a requirement. Greater or fewer components may alternatively be implemented.

In addition, the display device 100 is named the mobile terminal.

Hereinafter, each component 110 to 190 is described in sequence.

The wireless communication unit 110 may typically include one or more modules which permit wireless communications between the mobile terminal 100 and a wireless communication system or between the mobile terminal 100 and a network within which the mobile terminal 100 is located. For example, the wireless communication unit 110 may include at least one of a broadcast receiving module 111, a mobile communication module 112, a wireless Internet module 113, a short-range communication module 114, a location information module 115 and the like.

The broadcast receiving module 111 receives a broadcast signal and/or broadcast associated information from an external broadcast managing entity via a broadcast channel.

The broadcast channel may include a satellite channel and a terrestrial channel. The broadcast managing entity may indicate a server which generates and transmits a broadcast signal and/or broadcast associated information or a server which receives a pre-generated broadcast signal and/or broadcast associated information and sends them to the mobile terminal. The broadcast signal may be implemented as a TV broadcast signal, a radio broadcast signal, and a data broadcast signal, among others. The broadcast signal may further include a data broadcast signal combined with a TV or radio broadcast signal.

Examples of broadcast associated information may include information associated with a broadcast channel, a broadcast program, a broadcast service provider, and the like. The broadcast associated information may be provided via a mobile communication network, and received by the mobile communication module 112.

The broadcast associated information may be implemented in various formats. For instance, broadcast associated information may include Electronic Program Guide (EPG) of Digital Multimedia Broadcasting (DMB), Electronic Service Guide (ESG) of Digital Video Broadcast-Handheld (DVB-H), and the like.

The broadcast receiving module 111 may be configured to receive digital broadcast signals transmitted from various types of broadcast systems. Such broadcast systems may include Digital Multimedia Broadcasting-Terrestrial (DMB-T), Digital Multimedia Broadcasting-Satellite (DMB-S), Media Forward Link Only (MediaFLO), Digital Video Broadcast-Handheld (DVB-H), Integrated Services Digital Broadcast-Terrestrial (ISDB-T) and the like. The broadcast receiving module 111 may be configured to be suitable for every broadcast system transmitting broadcast signals as well as the digital broadcasting systems.

Broadcast signals and/or broadcast associated information received via the broadcast receiving module 111 may be stored in a suitable device, such as a memory 160.

The mobile communication module 112 transmits/receives wireless signals to/from at least one of network entities (e.g., base station, an external mobile terminal, a server, etc.) on a mobile communication network. Here, the wireless signals may include audio call signal, video (telephony) call signal, or various formats of data according to transmission/reception of text/multimedia messages.

The mobile communication module 112 may implement a video call mode and a voice call mode. The video call mode indicates a state of calling with watching a callee's image. The voice call mode indicates a state of calling without watching the callee's image. The wireless communication module 112 may transmit and receive at least one of voice and image in order to implement the video call mode and the voice call mode.

The wireless Internet module 113 supports wireless Internet access for the mobile terminal. This module may be internally or externally coupled to the mobile terminal 100. Examples of such wireless Internet access may include Wireless LAN (WLAN) (Wi-Fi), Wireless Broadband (Wibro), Worldwide Interoperability for Microwave Access (Wimax), High Speed Downlink Packet Access (HSDPA) and the like.

The short-range communication module 114 denotes a module for short-range communications. Suitable technologies for implementing this module may include BLUETOOTH™, Radio Frequency IDentification (RFID), Infrared Data Association (IrDA), Ultra-WideBand (UWB), ZigBee™, Near Field Communication (NFC) and the like.

The location information module 115 denotes a module for detecting or calculating a position of a mobile terminal. An example of the location information module 115 may include a Global Position System (GPS) module.

Still referring to FIG. 1, the A/V input unit 120 is configured to provide audio or video signal input to the mobile terminal. The A/V input unit 120 may include a camera 121 and a microphone 122. The camera 121 receives and processes image frames of still pictures or video obtained by image sensors in a video call mode or a capturing mode. The processed image frames may be displayed on a display unit 151.

The image frames processed by the camera 121 may be stored in the memory 160 or transmitted to the exterior via the wireless communication unit 110. Also, user's position information and the like may be calculated from the image frames acquired by the camera 121. Two or more cameras 121 may be provided according to the configuration of the mobile terminal.

The microphone 122 may receive an external audio signal while the mobile terminal is in a particular mode, such as a phone call mode, a recording mode, a voice recognition mode, or the like. This audio signal is processed into digital data. The processed digital data is converted for output into a format transmittable to a mobile communication base station via the mobile communication module 112 in case of the phone call mode. The microphone 122 may include assorted noise removing algorithms to remove noise generated in the course of receiving the external audio signal.

The user input unit 130 may generate input data input by a user to control the operation of the mobile terminal. The user input unit 130 may include a keypad, a dome switch, a touchpad (e.g., static pressure/capacitance), a jog wheel, a jog switch and the like.

The sensing unit 140 provides status measurements of various aspects of the mobile terminal. For instance, the sensing unit 140 may detect a location of the mobile terminal 100, a presence or absence of user contact with the mobile terminal 100, the location of the mobile terminal 100, acceleration/deceleration of the mobile terminal 100, and the like, so as to generate a sensing signal for controlling the operation of the mobile terminal 100. Other examples include sensing functions, such as the sensing unit 140 sensing the presence or absence of power provided by the power supply 190, the presence or absence of a coupling or other connection between the interface unit 170 and an external device.

The output unit 150 is configured to output an audio signal, a video signal or a tactile signal. The output unit 150 may include a display unit 151, an audio output module 153, an alarm unit 154 and a haptic module 155.

The display unit 151 may output information processed in the mobile terminal 100. For example, when the mobile terminal is operating in a phone call mode, the display unit 151 will provide a User Interface (UI) or a Graphic User Interface (GUI), which includes information associated with the call. As another example, if the mobile terminal is in a video call mode or a capturing mode, the display unit 151 may additionally or alternatively display images captured and/or received, UI, or GUI.

The display unit 151 may be implemented using, for example, at least one of a Liquid Crystal Display (LCD), a Thin Film Transistor-Liquid Crystal Display (TFT-LCD), an Organic Light-Emitting Diode (OLED), a flexible display, a three-dimensional (3D) display, an e-ink display or the like.

Some of such displays 151 may be implemented as a transparent type or an optical transparent type through which the exterior is visible, which is referred to as 'transparent display'. A representative example of the transparent display may include a Transparent OLED (TOLED), and the like. The rear surface of the display unit 151 may also be implemented to be optically transparent. Under this configuration, a user can view an object positioned at a rear side of a terminal body through a region occupied by the display unit 151 of the terminal body.

The display unit 151 may be implemented in two or more in number according to a configured aspect of the mobile terminal 100. For instance, a plurality of the displays 151 may be arranged on one surface to be spaced apart from or integrated with each other, or may be arranged on different surfaces.

The display unit 151 may also be implemented as a stereoscopic display unit 152 for displaying stereoscopic images.

Here, the stereoscopic image may be a three-dimensional (3D) stereoscopic image, and the 3D stereoscopic image is an image refers to an image making a viewer feel that a gradual depth and reality of an object on a monitor or a screen is the same as a reality space. A 3D stereoscopic image is implemented by using binocular disparity. Binocular disparity refers to disparity made by the positions of two eyes. When two eyes view different 2D images, the images are transferred to the brain through the retina and combined in the brain to provide the perception of depth and reality sense.

The stereoscopic display unit 152 may employ a stereoscopic display scheme such as stereoscopic scheme (a glass scheme), an auto-stereoscopic scheme (glassless scheme), a projection scheme (holographic scheme), or the like. Stereoscopic schemes commonly used for home television receivers, or the like, include Wheatstone stereoscopic scheme, or the like.

The auto-stereoscopic scheme includes, for example, a parallax barrier scheme, a lenticular scheme, an integral imaging scheme, or the like. The projection scheme includes a reflective holographic scheme, a transmissive holographic scheme, or the like.

In general, a 3D stereoscopic image is comprised of a left image (a left eye image) and a right image (a right eye image). According to how left and right images are combined into a 3D stereoscopic image, the 3D stereoscopic imaging method is divided into a top-down method in which left and right images are disposed up and down in a frame, an L-to-R (left-to-right, side by side) method in which left and right images are disposed left and right in a frame, a checker board method in which fragments of left and right images are disposed in a tile form, an interlaced method in which left and right images are alternately disposed by columns and rows, and a time sequential (or frame by frame) method in which left and right images are alternately displayed by time.

Also, as for a 3D thumbnail image, a left image thumbnail and a right image thumbnail are generated from a left image and a right image of the original image frame, respectively, and then combined to generate a single 3D thumbnail image. In general, thumbnail refers to a reduced image or a reduced still image. The thusly generated left image thumbnail and the right image thumbnail are displayed with a horizontal distance difference therebetween by a depth corresponding to the disparity between the left image and the right image on the screen, providing a stereoscopic space sense.

As illustrated, a left image and a right image required for implementing a 3D stereoscopic image is displayed on the stereoscopic display unit 152 by a stereoscopic processing unit (not shown). The stereoscopic processing unit may receive the 3D image and extract the left image and the right image, or may receive the 2D image and change it into a left image and a right image.

Here, if the display unit 151 and a touch sensitive sensor (referred to as a touch sensor) have a layered structure therebetween (referred to as a 'touch screen'), the display unit 151 may be used as an input device as well as an output device. The touch sensor may be implemented as a touch film, a touch sheet, a touchpad, and the like.

The touch sensor may be configured to convert changes of a pressure applied to a specific part of the display unit 151, or a capacitance occurring from a specific part of the display unit 151, into electric input signals. Also, the touch sensor may be configured to sense not only a touched position and a touched area, but also touch pressure. Here, a touch object is an object to apply a touch input onto the touch sensor. Examples of the touch object may include a finger, a touch pen, a stylus pen, a pointer or the like.

When touch inputs are sensed by the touch sensors, corresponding signals are transmitted to a touch controller. The touch controller processes the received signals, and then transmits corresponding data to the controller 180. Accordingly, the controller 180 may sense which region of the display unit 151 has been touched.

Still referring to FIG. 1, a proximity sensor 141 may be arranged at an inner region of the mobile terminal 100 covered by the touch screen, or near the touch screen. The proximity sensor 141 may be provided as one example of the sensing unit 140. The proximity sensor 141 indicates a sensor to sense presence or absence of an object approaching to a surface to be sensed, or an object disposed near a surface to be sensed, by using an electromagnetic field or infrared rays without a mechanical contact. The proximity sensor 141 has a longer lifespan and a more enhanced utility than a contact sensor.

The proximity sensor 141 may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, proximity of a pointer to the touch screen is sensed by changes of an electromagnetic field. In this case, the touch screen (touch sensor) may be categorized into a proximity sensor.

Hereinafter, for the sake of brief explanation, a status that the pointer is positioned to be proximate onto the touch screen without contact will be referred to as 'proximity touch', whereas a status that the pointer substantially comes in contact with the touch screen will be referred to as 'contact touch'. For the position corresponding to the proximity touch of the pointer on the touch screen, such position corresponds to a position where the pointer faces perpendicular to the touch screen upon the proximity touch of the pointer.

The proximity sensor 141 senses proximity touch, and proximity touch patterns (e.g., distance, direction, speed, time, position, moving status, etc.). Information relating to the sensed proximity touch and the sensed proximity touch patterns may be output onto the touch screen.

When a touch sensor is overlaid on the stereoscopic display unit 152 in a layered manner (hereinafter, referred to as 'stereoscopic touch screen'), or when the stereoscopic display unit 152 and a 3D sensor sensing a touch operation are combined, the stereoscopic display unit 152 may also be used as a 3D input device.

As examples of the 3D sensor, the sensing unit 140 may include a proximity sensor 141, a stereoscopic touch sensing unit 142, an ultrasonic sensing unit 143, and a camera sensing unit 144.

The proximity sensor 141 detects the distance between a sensing object (e.g., the user's finger or a stylus pen) applying a touch by using the force of electromagnetism or infrared rays without a mechanical contact and a detect surface. By using the distance, the terminal recognizes which portion of a stereoscopic image has been touched. In particular, when the touch screen is an electrostatic touch screen, the degree of proximity of the sensing object is detected based on a change of an electric field according to proximity of the sensing object, and a touch to the 3D image is recognized by using the degree of proximity.

The stereoscopic touch sensing unit 142 is configured to detect the strength or duration of a touch applied to the touch screen. For example, the stereoscopic touch sensing unit 142 may sense touch pressure. When the pressure is strong, it may recognize the touch as a touch with respect to an object located farther away from the touch screen toward the inside of the terminal.

The ultrasonic sensing unit 143 is configured to recognize position information of the sensing object by using ultrasonic waves.

The ultrasonic sensing unit 143 may include, for example, an optical sensor and a plurality of ultrasonic sensors. The optical sensor is configured to sense light and the ultrasonic sensors may be configured to sense ultrasonic waves. Since light is much faster than ultrasonic waves, a time for which the light reaches the optical sensor is much shorter than a time for which the ultrasonic wave reaches the ultrasonic sensor. Therefore, a position of a wave generation source may be calculated by using a time difference from the time that the ultrasonic wave reaches based on the light as a reference signal.

The camera sensing unit 144 includes at least one of a camera 121, a photo sensor, and a laser sensor.

For example, the camera 121 and the laser sensor may be combined to detect a touch of the sensing object with respect to a 3D stereoscopic image. When distance information detected by a laser sensor is added to a 2D image captured by the camera, 3D information can be obtained.

In another example, a photo sensor may be laminated on the display device. The photo sensor is configured to scan a movement of the sensing object in proximity to the touch screen. In detail, the photo sensor includes photo diodes and transistors at rows and columns to scan content mounted on the photo sensor by using an electrical signal changing according to the quantity of applied light. Namely, the photo sensor calculates the coordinates of the sensing object according to variation of light to thus obtain position information of the sensing object.

The audio output module 153 may convert and output as sound audio data received from the wireless communication unit 110 or stored in the memory 160 in a call signal reception mode, a call mode, a record mode, a voice recognition mode, a broadcast reception mode, and the like. Also, the audio output module 153 may provide audible outputs related to a particular function performed by the mobile terminal 100 (e.g., a call signal reception sound, a message reception sound, etc.). The audio output module 153 may include a speaker, a buzzer or the like.

The alarm unit 154 outputs a signal for informing about an occurrence of an event of the mobile terminal 100. Events generated in the mobile terminal may include call signal reception, message reception, key signal inputs, a touch input etc. In addition to video or audio signals, the alarm unit 154 may output signals in a different manner, for example, using vibration to inform about an occurrence of an event. The video or audio signals may be also outputted via the audio output module 153, so the display unit 151 and the audio output module 153 may be classified as parts of the alarm unit 154.

A haptic module 155 generates various tactile effects the user may feel. A typical example of the tactile effects generated by the haptic module 155 is vibration. The strength and pattern of the haptic module 155 can be controlled. For example, different vibrations may be combined to be outputted or sequentially outputted.

Besides vibration, the haptic module 155 may generate various other tactile effects such as an effect by stimulation such as a pin arrangement vertically moving with respect to a contact skin, a spray force or suction force of air through a jet orifice or a suction opening, a contact on the skin, a contact of an electrode, electrostatic force, etc., an effect by reproducing the sense of cold and warmth using an element that can absorb or generate heat.

The haptic module 155 may be implemented to allow the user to feel a tactile effect through a muscle sensation such as fingers or arm of the user, as well as transferring the tactile effect through a direct contact. Two or more haptic modules 155 may be provided according to the configuration of the mobile terminal 100.

The memory 160 may store software programs used for the processing and controlling operations performed by the controller 180, or may temporarily store data (e.g., a phonebook, messages, still images, video, etc.) that are inputted or outputted. In addition, the memory 160 may store data regarding various patterns of vibrations and audio signals outputted when a touch is inputted to the touch screen.

The memory 160 may include at least one type of storage medium including a Flash memory, a hard disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 160 over the Internet.

The interface unit 170 serves as an interface with every external device connected with the mobile terminal 100. For example, the external devices may transmit data to an external device, receives and transmits power to each element of the mobile terminal 100, or transmits internal data of the mobile terminal 100 to an external device. For example, the interface unit 170 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating the authority of using the mobile terminal 100 and may include a user identity module (UIM), a subscriber identity module (SIM) a universal subscriber identity module (USIM), and the like. In addition, the device having the identification module (referred to as 'identifying device', hereinafter) may take the form of a smart card. Accordingly, the identifying device may be connected with the terminal 100 via the interface unit 170.

When the mobile terminal 100 is connected with an external cradle, the interface unit 170 may serve as a passage to allow power from the cradle to be supplied therethrough to the mobile terminal 100 or may serve as a passage to allow various command signals inputted by the user from the cradle to be transferred to the mobile terminal therethrough. Various command signals or power inputted from the cradle may operate as signals for recognizing that the mobile terminal is properly mounted on the cradle.

The controller 180 typically controls the general operations of the mobile terminal. For example, the controller 180 performs controlling and processing associated with voice calls, data communications, video calls, and the like. The controller 180 may include a multimedia module 181 for reproducing multimedia data. The multimedia module 181 may be configured within the controller 180 or may be configured to be separated from the controller 180.

The controller 180 may perform a pattern recognition processing to recognize a handwriting input or a picture drawing input performed on the touch screen as characters or images, respectively.

Also, the controller 180 may execute a lock state to restrict a user from inputting control commands for applications when a state of the mobile terminal meets a preset condition. Also, the controller 180 may control a lock screen displayed in the lock state based on a touch input sensed on the display unit 151 in the lock state of the mobile terminal.

The power supply unit 190 receives external power or internal power and supplies appropriate power required for operating respective elements and components under the control of the controller 180.

Various embodiments described herein may be implemented in a computer-readable or its similar medium using, for example, software, hardware, or any combination thereof.

For hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some cases, such embodiments may be implemented by the controller 180 itself.

For software implementation, the embodiments such as procedures or functions described herein may be implemented by separate software modules. Each software module may perform one or more functions or operations described herein.

Software codes can be implemented by a software application written in any suitable programming language. The software codes may be stored in the memory 160 and executed by the controller 180.

Hereinafter, a communication system which is operable with the mobile terminal 100 according to the present disclosure will be described.

Figure 2A:
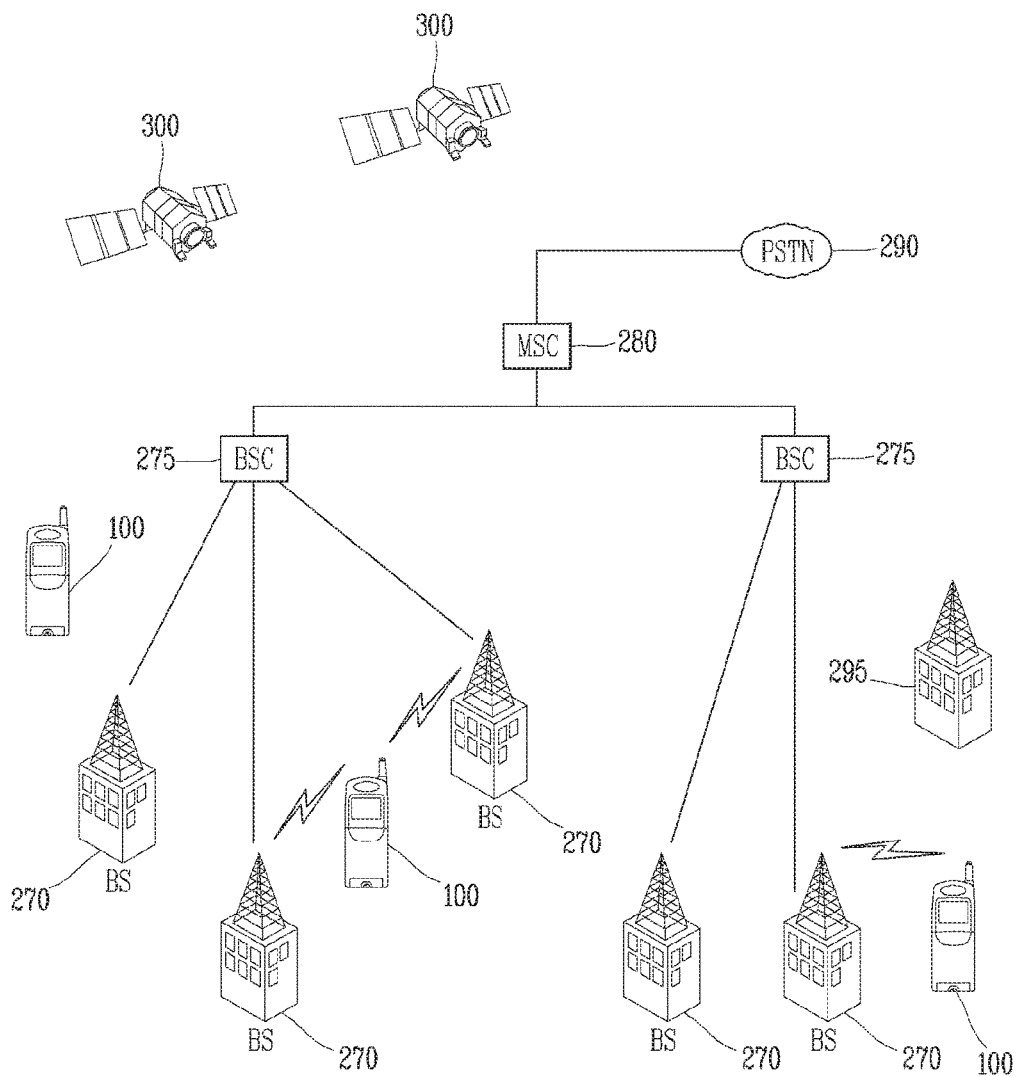
FIG. 2a and FIG. 2b are diagrams, each illustrating a telecommunication system in which the mobile terminal according to the present invention can operate.
Figure 2B:
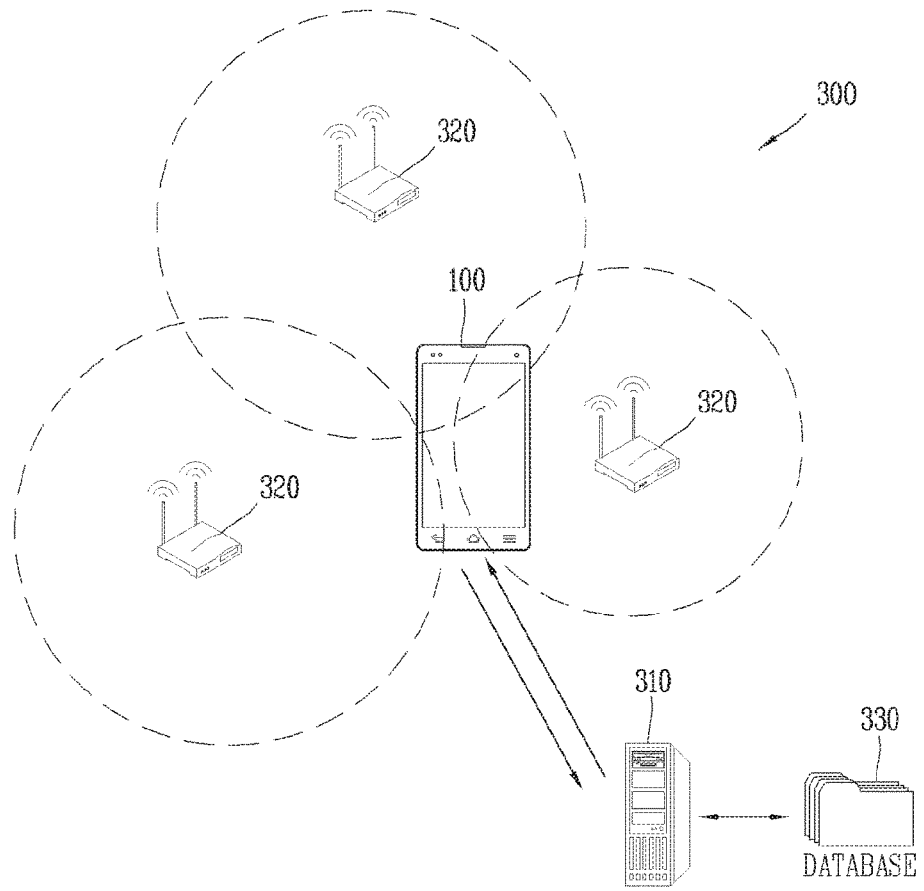

FIGS. 2A and 2B are conceptual views of a communication system operable with a mobile terminal in accordance with the present disclosure.

First, referring to FIG. 2A, such communication systems utilize different air interfaces and/or physical layers. Examples of such air interfaces utilized by the communication systems include Frequency Division Multiple Access (FDMA), Time Division Multiple Access (TDMA), Code Division Multiple Access (CDMA), and Universal Mobile Telecommunications System (UMTS), the Long Term Evolution (LTE) of the UMTS, the Global System for Mobile Communications (GSM), and the like.

By way of non-limiting example only, further description will relate to a CDMA communication system, but such teachings apply equally to other system types including the CDMA wireless communication system.

Referring now to FIG. 2A, a CDMA wireless communication system is shown having a plurality of mobile terminals 100, a plurality of base stations (BSs) 270, base station controllers (BSCs) 275, and a mobile switching center (MSC) 280. The MSC 280 is configured to interface with a conventional Public Switch Telephone Network (PSTN) 290. The MSC 280 is also configured to interface with the BSCs 275. The BSCs 275 are coupled to the base stations 270 via backhaul lines. The backhaul lines may be configured in accordance with any of several known interfaces including, for example, E1/T1, ATM, IP, PPP, Frame Relay, HDSL, ADSL, or xDSL. Hence, the plurality of BSCs 275 can be included in the system as shown in FIG. 2A.

Each base station 270 may include one or more sectors, each sector having an omni-directional antenna or an antenna pointed in a particular direction radially away from the base station 270. Alternatively, each sector may include two or more different antennas. Each base station 270 may be configured to support a plurality of frequency assignments, with each frequency assignment having a particular spectrum (e.g., 1.25 MHz, 5 MHz, etc.).

The intersection of sector and frequency assignment may be referred to as a CDMA channel. The base stations 270 may also be referred to as Base Station Transceiver Subsystems (BTSs). In some cases, the term "base station" may be used to refer col-lectively to a BSC 275, and one or more base stations 270. The base stations may also be denoted as "cell sites." Alternatively, individual sectors of a given base station 270 may be referred to as cell sites.

A broadcasting transmitter (BT) 295, as shown in FIG. 2A, transmits a broadcast signal to the mobile terminals 100 operating within the system. The broadcast receiving module 111 (FIG. 1B) is typically configured inside the mobile terminal 100 to receive broadcast signals transmitted by the BT 295.

FIG. 2A further depicts several Global Positioning System (GPS) satellites 300. Such satellites 300 facilitate locating the position of at least one of plural mobile terminals 100. Two satellites are depicted in FIG. 2, but it is understood that useful position information may be obtained with greater or fewer satellites than two satellites. The GPS module 115 (FIG. 1B) is typically configured to cooperate with the satellites 300 to obtain desired position information. It is to be appreciated that other types of position detection technology, (i.e., location technology that may be used in addition to or instead of GPS location technology) may alternatively be implemented. If desired, at least one of the GPS satellites 300 may alternatively or additionally be configured to provide satellite DMB transmissions.

During typical operation of the wireless communication system, the base stations 270 receive sets of reverse-link signals from various mobile terminals 100. The mobile terminals 100 are engaging in calls, messaging, and executing other communications. Each reverse-link signal received by a given base station 270 is processed within that base station 270. The resulting data is forwarded to an associated BSC 275. The BSC 275 provides call resource allocation and mobility management functionality including the orchestration of soft handoffs between base stations 270. The BSCs 275 also route the received data to the MSC 280, which then provides additional routing services for interfacing with the PSTN 290. Similarly, the PSTN 290 interfaces with the MSC 280, and the MSC 280 interfaces with the BSCs 275, which in turn control the base stations 270 to transmit sets of forward-link signals to the mobile terminals 100.

Hereinafter, description will be given of a method for acquiring location information of a mobile terminal using a wireless fidelity (WiFi) positioning system (WPS), with reference to FIG. 2B.

The WiFi positioning system (WPS) 300 refers to a location determination technology based on a wireless local area network (WLAN) using WiFi as a technology for tracking the location of the mobile terminal 100 using a WiFi module provided in the mobile terminal 100 and a wireless access point 320 for transmitting and receiving to and from the WiFi module.

The WiFi positioning system 300 may include a WiFi location determination server 310, a mobile terminal 100, a wireless access point (AP) 320 connected to the mobile terminal 100, and a database 330 stored with any wireless AP information.

The WiFi location determination server 310 extracts the information of the wireless AP 320 connected to the mobile terminal 100 based on a location information request message (or signal) of the mobile terminal 100. The information of the wireless AP 320 may be transmitted to the WiFi location determination server 310 through the mobile terminal 100 or transmitted to the WiFi location determination server 310 from the wireless AP 320.

The information of the wireless AP extracted based on the location information request message of the mobile terminal 100 may be at least one of MAC address, SSID, RSSI, channel information, privacy, network type, signal strength and noise strength.

The WiFi location determination server 310 receives the information of the wireless AP 320 connected to the mobile terminal 100 as described above, and compares the received wireless AP 320 information with information contained in the pre-established database 330 to extract (or analyze) the location information of the mobile terminal 100.

On the other hand, referring to FIG. 2B, as an example, the wireless AP connected to the mobile terminal 100 is illustrated as a first, a second, and a third wireless AP 320. However, the number of wireless APs connected to the mobile terminal 100 may be changed in various ways according to a wireless communication environment in which the mobile terminal 100 is located. When the mobile terminal 100 is connected to at least one of wireless APs, the WiFi positioning system 300 can track the location of the mobile terminal 100.

Next, considering the database 330 stored with any wireless AP information in more detail, various information of any wireless APs disposed at different locations may be stored in the database 330.

The information of any wireless APs stored in the database 330 may be information such as MAC address, SSID, RSSI, channel information, privacy, network type, latitude and longitude coordinate, building at which the wireless AP is located, floor number, detailed indoor location information (GPS coordinate available), AP owner's address, phone number, and the like.

In this manner, any wireless AP information and location information corresponding to the any wireless AP are stored together in the database 330, and thus the WiFi location determination server 310 may retrieve wireless AP information corresponding to the information of the wireless AP 320 connected to the mobile terminal 100 from the database 330 to extract the location information matched to the searched wireless AP, thereby extracting the location information of the mobile terminal 100.

Furthermore, the extracted location information of the mobile terminal 100 may be transmitted to the mobile terminal 100 through the WiFi location determination server 310, thereby acquiring the location information of the mobile terminal 100.

A device for controlling the mobile terminal that is capable of preventing a touch-caused malfunction that occurs because when a user grips the mobile terminal 100 a specific region (for example, a bezel (an external appearance/edge) region) of a touch screen is touched on and a method of controlling the mobile terminal are described below.

Figure 3:
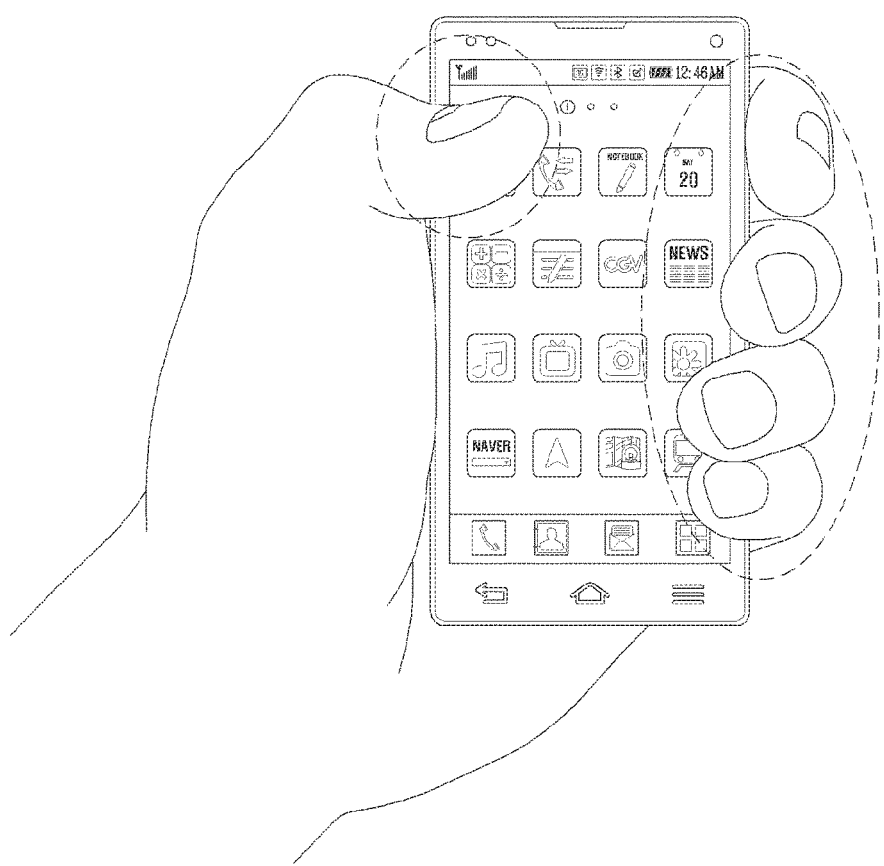
FIG. 3 is a diagram illustrating a state in which the mobile terminal is gripped by the user.

FIG. 3 is a diagram illustrating a state in which the mobile terminal 100 is gripped by the user.

As illustrated in FIG. 3, the gripping by the user of the mobile terminal 100 causes the bezel region of the screen to be touched on by the user.

Figure 4:
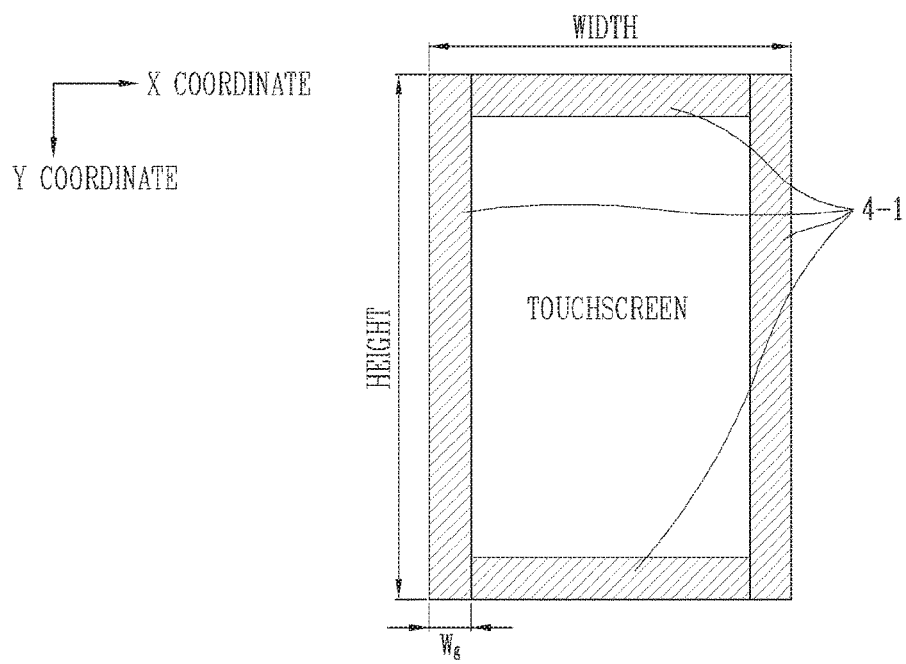
FIG. 4 is a diagram illustrating a bezel region of a touch screen of the mobile terminal.

FIG. 4 is a diagram illustrating the bezel region of the touch screen of the mobile terminal 100.

As illustrated in FIG. 4, a bezel region 4-1 of the touch screen is configured to include a first bezel region that is positioned on the left side (or upper side) of the touch screen and a second bezel region that is positioned on the right side (or lower side) of the touch screen. A width Wg of the bezel region 4-1 is pre-set by a product designer or is set by the user. For example, the bezel region 4-1 is dragged (moved) to the left or to the right by the user, the controller 180 re-sets as the bezel region 4-1 a width Wg from a position on the touch screen at which the dragging is started to an outer edge of the touch screen.

The controller 180 receives a touch input with respect to the bezel region of the touch screen of the display unit 151, detects an amount of change in coordinates corresponding to the touch input, and blocks touch information corresponding to the touch input, based on the detected amount of change.

Figure 5:
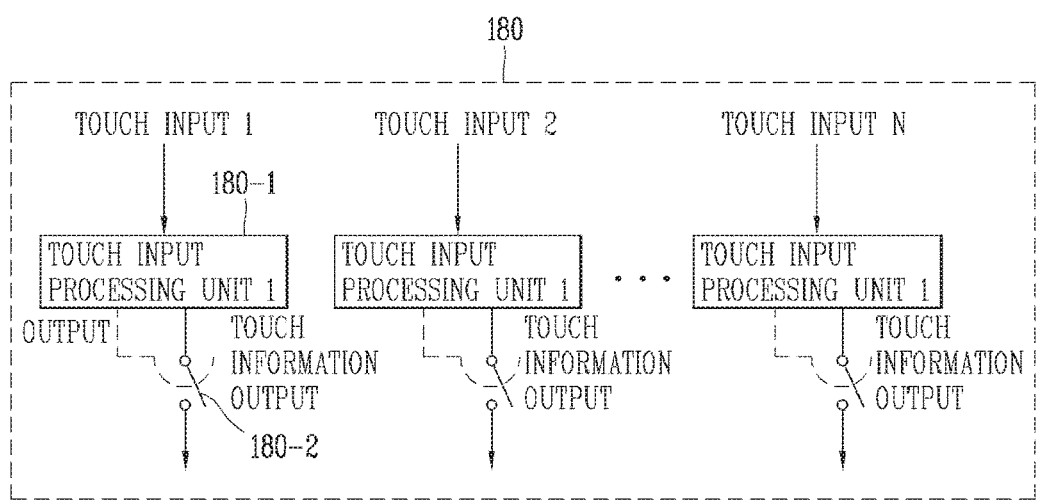
FIG. 5 is a diagram illustrating a configuration of a controller of the mobile terminal according to embodiments of the present invention.

As illustrated in FIG. 5, the controller 180 includes a touch input processing unit 180-1 that generates a control signal for blocking the touch information corresponding to the touch input when the detected amount of change is equal to or less than a reference amount of change and a switch 180-2 that blocks the touch information corresponding to the touch input, based on the control signal. Multiple touch input processing units 180-1 and the multiple switches 180-2 are configured to process a multi-touch input (a touch input 1, a touch input 2, and a touch input N). The touch information corresponding to the touch input indicates information including an x coordinate value, an y coordinate value, a touch-area size, a touch application period of time from a touch starting point in time to a touch ending point in time, and others.

If an area (the x coordinate value) corresponding to the touch input is smaller than the width Wg of the bezel region 4-1 or is larger than a value that is obtained by sub-tracting the width Wg of the bezel region 4-1 from a width of the touch screen, the controller 180 outputs the touch information corresponding to the touch input to the touch control unit.

FIG. 5 is a diagram illustrating a configuration of the controller of the mobile terminal 100 according to embodiments of the present invention.

Figure 6:
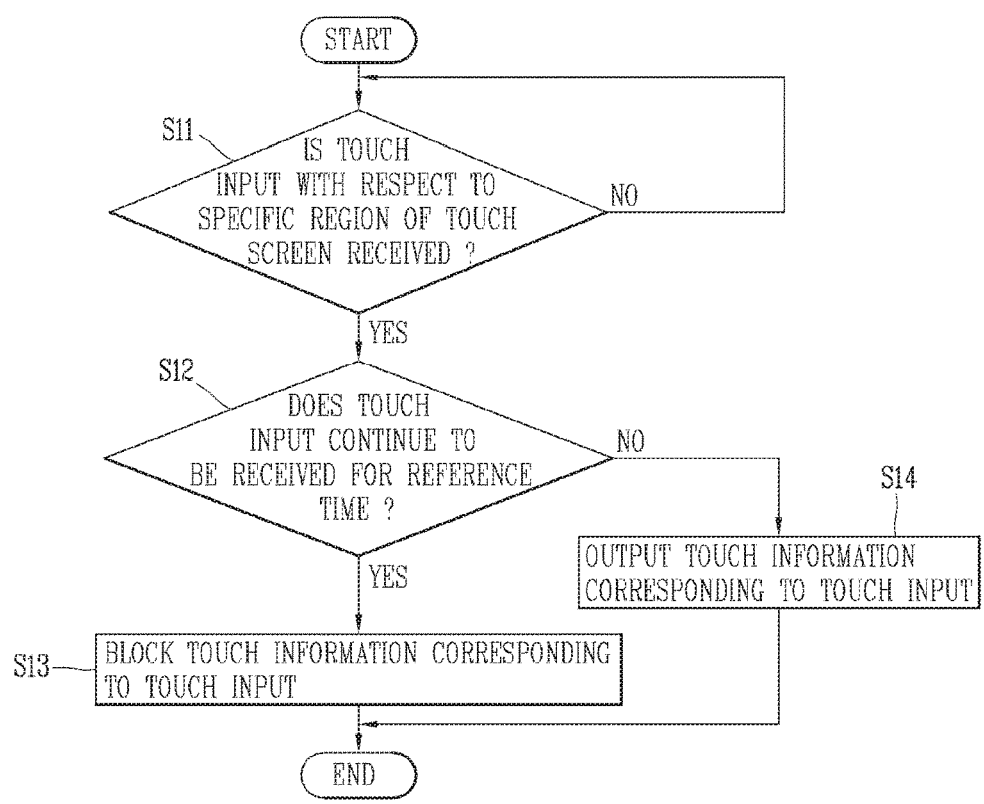
FIG. 6 is a flowchart illustrating a method of controlling a mobile terminal according to a first embodiment of the present invention.

FIG. 6 is a flowchart illustrating a method of controlling a mobile terminal 100 according to a first embodiment of the present invention.

First, the controller 180 determines whether the touch input with respect to the bezel region 4-1 of the touch screen is received (S11). For example, the controller 180 determines a specific point on the bezel region 4-1 of the touch screen is touched on by the user.

When the touch input with respect to the bezel region 4-1 of the touch screen is received, the controller 180 determines whether the touch input continues to be input for pre-set reference time for which a state in which the mobile terminal 100 is gripped by the user is recognized (S12). For example, the controller 180 determines whether the specific point on the bezel region 4-1 of the touch screen continues to be touched on by the user for the pre-set time. That is, when the user grips the mobile terminal 100, the specific point on the bezel region 4-1 of the touch screen is touched on by the user and generally the touched state continues to be maintained for given time. The pre-set time is pre-set by the product designer and is changed by the user.

When the touch input continues to be received for the pre-set time, the controller 180 blocks the touch information corresponding to the touch input (S13). When the specific point on the bezel region 4-1 of the touch screen continues to be touched on by the user, the controller 180 prevents the touch-caused malfunction of the touch screen by blocking the touch information corresponding to the touch input. For example, the touch-caused malfunction is prevented which occurs because when the user grips the mobile terminal 100 the bezel region of the touch screen to grip is touched on.

When a duration of the touch input is smaller than the pre-set time, the controller 180 outputs the touch information corresponding to the touch input (S14). For example, when the touch input is received one time, or does not continue to be received, the controller 180 outputs the touch information corresponding to the touch input to the touch control unit.

When an X-axis coordinate value of a touch point corresponding to the touch input is smaller than the bezel region 4-1 of the touch screen or is larger than a region that results from excluding the bezel region 4-1 of the touch screen from the width of the touch screen, the controller 180 stores coordinates of the touch corresponding to the touch point in the memory 160.

Conversely, when the X-axis coordinate value of the touch point corresponding to the touch input is larger than the bezel region 4-1 of the touch screen or is smaller than the region that results from excluding the bezel region 4-1 of the touch screen from the width of the touch screen, the controller 180 outputs the coordinates of the touch corresponding to the touch point corresponding to the touch control unit.

When the X-axis coordinate value of a touch point corresponding to the touch input is larger than the bezel region 4-1 of the touch screen, or is smaller than the region that results from excluding the bezel region 4-1 of the touch screen from the width of the touch screen and a touch area corresponding to the touch point is larger than a reference touch area for recognizing a gripped state, the controller 180 stores the coordinates of the touch corresponding to the touch point in the memory 160.

When the X-axis coordinate value of a touch point corresponding to the touch input is larger than the bezel region 4-1 of the touch screen, or is smaller than the region that results from excluding the bezel region 4-1 of the touch screen from the width of the touch screen and the touch area corresponding to the touch point is smaller than the reference touch area for recognizing the gripped state, the controller 180 outputs the coordinates of the touch corresponding to the touch point to the touch control unit.

Therefore, in the device for controlling the mobile terminal according to the first embodiment of the present invention and the method of controlling the mobile terminal, when the touch input continues to be received for the reference time for which the state in which the mobile terminal 100 is gripped by the user is recognized, the touch-caused malfunction that occurs because when the user grips the mobile terminal 100 the bezel region of the touch screen is touched on is prevented by blocking the touch information corresponding to the touch input.

A device for controlling a mobile terminal according to a second embodiment of the present invention, which is capable of preventing a touch-caused malfunction that occurs because when the user grips the mobile terminal a specific region of a touch screen is touched on, and a method of controlling the mobile terminal are described below referring to FIG. 7.

Figure 7:
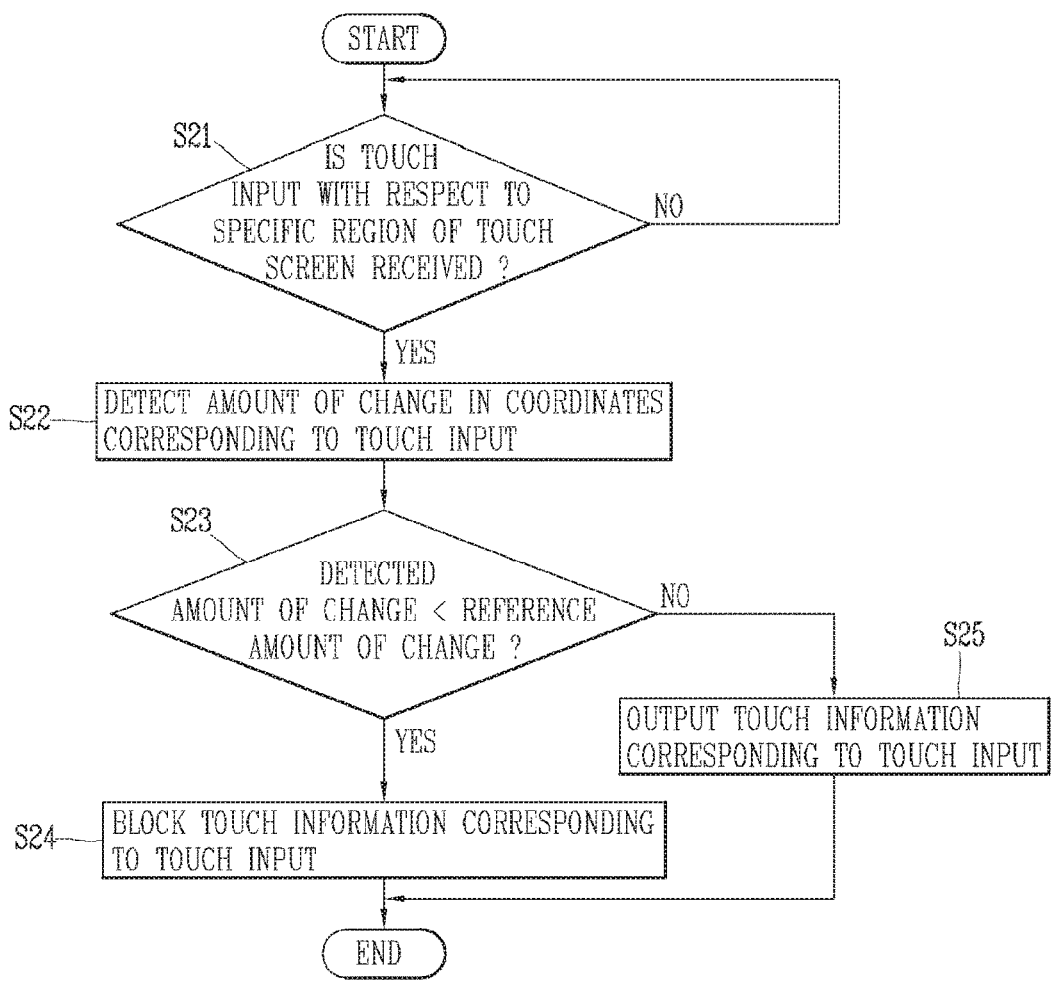
FIG. 7 is a flowchart illustrating a method of controlling a mobile terminal according to a second embodiment of the present invention.

FIG. 7 is a flowchart illustrating the method of controlling the mobile terminal 100 according to the second embodiment of the present invention.

First, the controller 180 determines whether a touch input with respect to a bezel region 4-1 of the touch screen is received (S21). For example, the controller 180 determines the bezel region 4-1 of the touch screen is touched on by the user.

When the touch input with respect to the bezel region 4-1 of the touch screen is received, the controller 180 detects an amount of change in coordinates corresponding to the touch input (S22). For example, the controller 180 determines whether a specific point on the bezel region 4-1 of the touch screen continues to be touched on by the user or the specific point on the bezel region 4-1 of the touch screen is moved in a specific direction in a state in which the specific point is touched on by the user. That is, when the user grips the mobile terminal 100, the state in which the specific point on the specific point on the bezel region 4-1 of the touch screen is touched on by the user continues to be maintained for given time, and thus the amount of change in coordinates corresponding to the touch input is not present or is too small.

The controller 180 determines whether the detected amount of change is equal to or less than a pre-set reference amount of change (S23). For example, the controller 180 determines whether the specific point on the bezel region 4-1 of the touch screen continues to be touched on without any movement by the user. The pre-set reference amount of change is "0," or is changed to various values by the user.

When the detected amount of change is equal to or less than the pre-set reference amount of change, the controller 180 blocks the touch information corresponding to the touch input (S24). When the specific point on the bezel region 4-1 of the touch screen continues to be touched on without any movement by the user, the controller 180 prevents the touch-caused malfunction of the touch screen by blocking the touch information corresponding to the touch input. For example, the touch-caused malfunction is prevented which occurs because when the user grips the mobile terminal 100 the bezel region of the touch screen is touched on.

When the detected amount of change exceeds the pre-set reference amount of change, the controller 180 outputs the touch information corresponding to the touch input (S25). When the detected amount of change exceeds the pre-set reference amount of change, the controller 180 outputs the touch information corresponding to the touch input to a touch control unit (S25).

When the detected amount of change maintains a state of being equal to or less than the pre-set reference amount of change, for pre-set time, the controller 180 may block the touch information corresponding to the touch input.

Therefore, in the device for controlling the mobile terminal according to the second embodiment of the present invention and the method of controlling the mobile terminal, when the detected amount of change is equal to or less than the reference amount of change for the reference time, the touch-caused malfunction that occurs because when the user grips the mobile terminal 100 the bezel region of the touch screen is touched on is effectively prevented by blocking the touch information corresponding to the touch input.

A device for controlling a mobile terminal according to a third embodiment of the present invention, which is capable of preventing a touch-caused malfunction that occurs because when the user grips the mobile terminal a specific region of a touch screen is touched on, and a method of controlling the mobile terminal are described below referring to FIG. 8.

Figure 8:
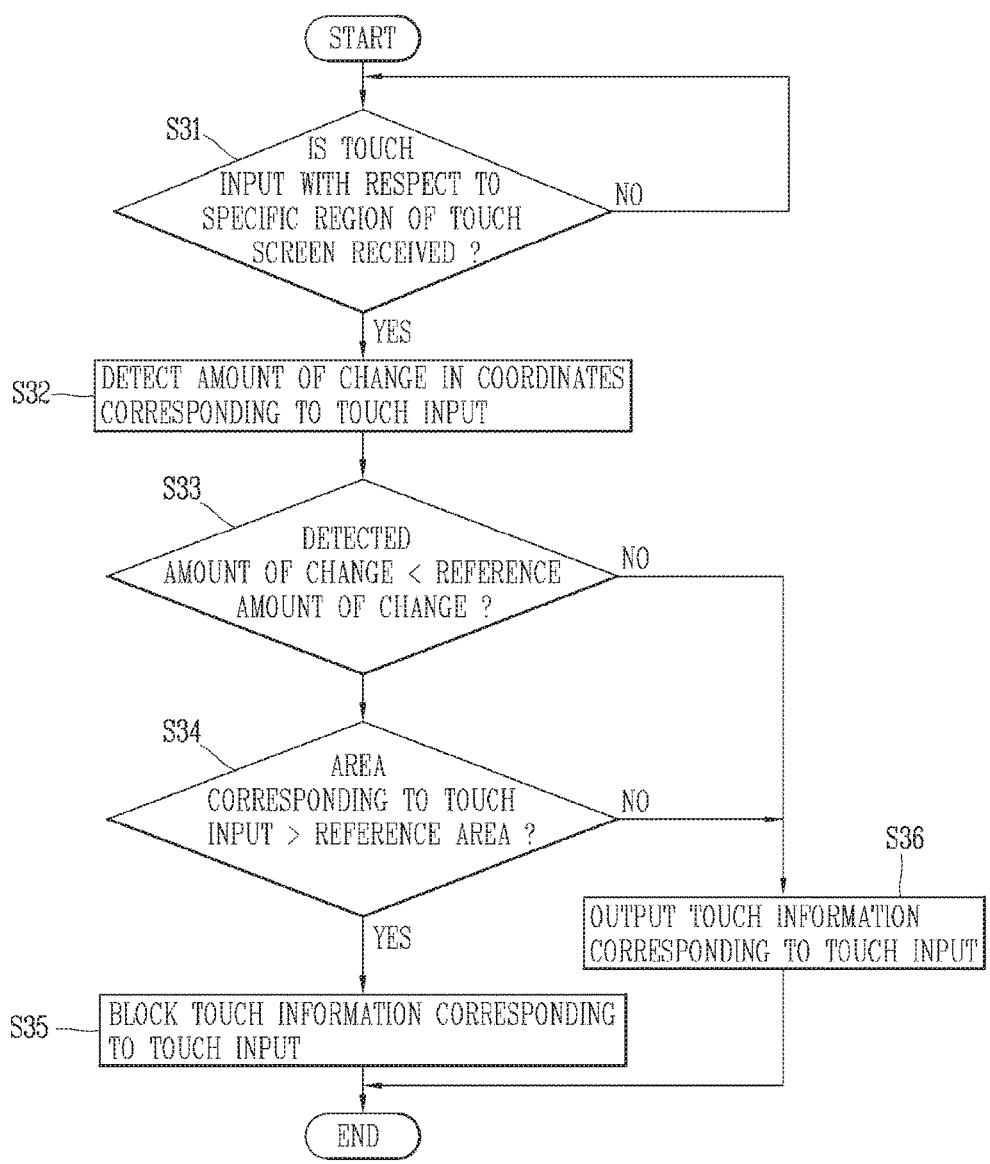
FIG. 8 is a flowchart illustrating a method of controlling a mobile terminal according to a third embodiment of the present invention.

FIG. 8 is a flowchart illustrating the method of controlling the mobile terminal 100 according to the third embodiment of the present invention.

First, the controller 180 determines whether a touch input with respect to a bezel region 4-1 of a touch screen is received (S31). For example, the controller 180 determines the bezel region 4-1 of the touch screen is touched on by the user.

When the touch input with respect to the bezel region 4-1 of the touch screen is received, the controller 180 detects an amount of change in coordinates corresponding to the touch input (S32). For example, the controller 180 determines whether a specific point on the bezel region 4-1 of the touch screen continues to be touched on by the user or the specific point on the bezel region 4-1 of the touch screen is moved in a specific direction in a state in which the specific point is touched on by the user. That is, when the user grips the mobile terminal 100, the state in which the specific point on the specific point on the bezel region 4-1 of the touch screen is touched on by the user continues to be maintained for given time, and thus the amount of change in coordinates corresponding to the touch input is not present or is too small.

The controller 180 determines whether the detected amount of change is equal to or less than a pre-set reference amount of change (S33). For example, the controller 180 determines whether the specific point on the bezel region 4-1 of the touch screen continues to be touched on without any movement by the user. The pre-set reference amount of change is "0," or is changed to various values by the user.

The controller 180 determines whether when the user grips the mobile terminal 100, a touch area (for example, an x coordinate value) corresponding to the touch input is equal to or more than a reference area (for example, 20 pixels) of the bezel region of the touch screen, which has to be touched on by a user's finger (S34). The reference area is an area of the bezel region of the touch screen, which, when the user grips the mobile terminal 100, has to be touched on, and can be re-set by the user.

When the touch area corresponding to the touch input is equal to or more than the reference area, the controller 180 blocks the touch information corresponding to the touch input (S35).

When the specific point on the bezel region 4-1 of the touch screen continues to be touched on without any movement by the user and the touch area corresponding to the touch input is equal to or more than the reference area, the controller 180 effectively prevents the touch-caused malfunction of the touch screen by blocking the touch information corresponding to the touch input.

When the touch area corresponding to the touch input is less than the reference area, the controller 180 outputs the touch information corresponding to the touch input (S36). For example, when the touch area corresponding to the touch input is less than the reference area, the controller 180 outputs the touch information corresponding to the touch input to a touch control unit.

When the detected amount of change maintains a state of being equal to or less than the pre-set reference amount of change, for pre-set time, and the touch area corresponding to the touch input is equal to or more than the reference area, the controller 180 blocks the touch information corresponding to the touch input.

Therefore, in the device for controlling the mobile terminal according to the third embodiment of the present invention and the method of controlling the mobile terminal, when the detected amount of change is equal to or less than the reference amount of change for the reference time and the touch area corresponding to the touch input is equal to or more than the reference area, the touch-caused malfunction that occurs because when the user grips the mobile terminal 100 the bezel region of the touch screen is touched on is effectively prevented by blocking the touch information corresponding to the touch input.

A device for controlling a mobile terminal according to a fourth embodiment of the present invention, which is capable of preventing a touch-caused malfunction that occurs because when the user grips the mobile terminal a specific region of a touch screen is touched on, and a method of controlling the mobile terminal are described below referring to FIGS. 9 to 12.

Figure 9:
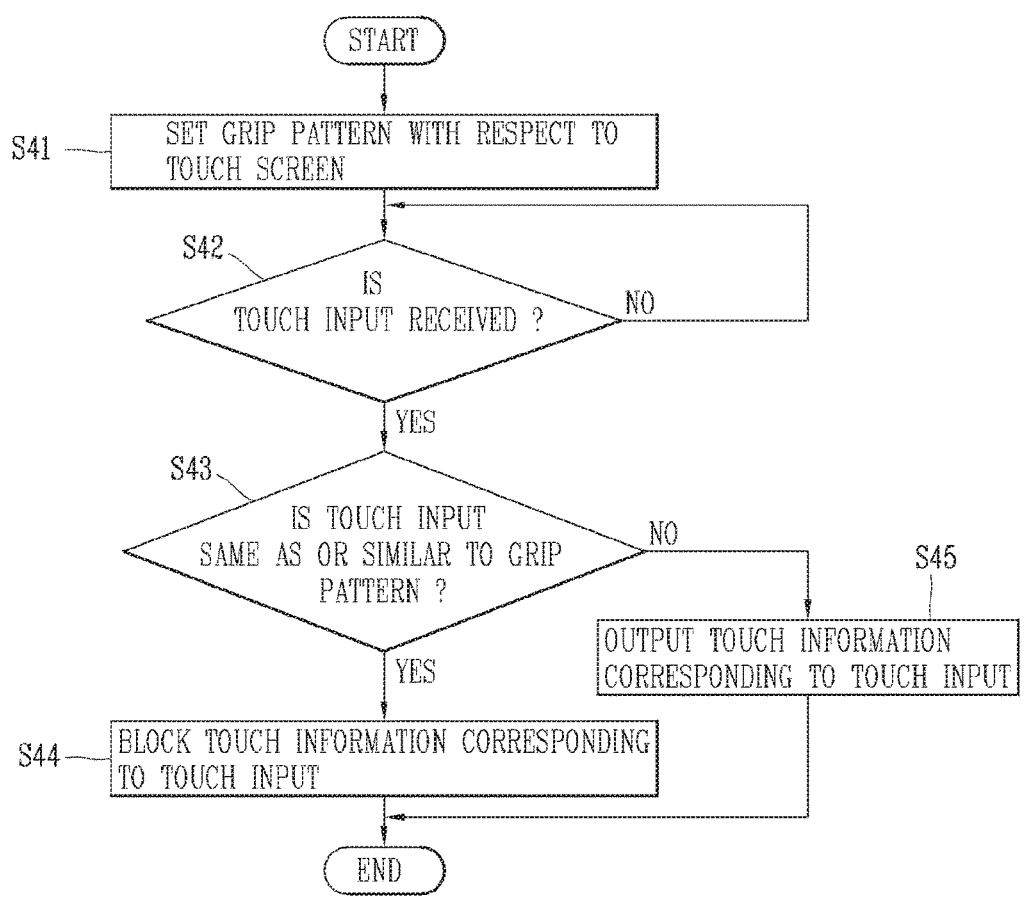
FIG. 9 is a flowchart illustrating a method of controlling a mobile terminal according to a fourth embodiment of the present invention.

FIG. 9 is a flowchart illustrating the method of controlling the mobile terminal 100 according to the fourth embodiment of the present invention.

First, when a grip pattern setting mode is selected by the user, the controller 180 displays a grip pattern setting screen for setting a grip pattern on the display unit 151.

Figure 10:
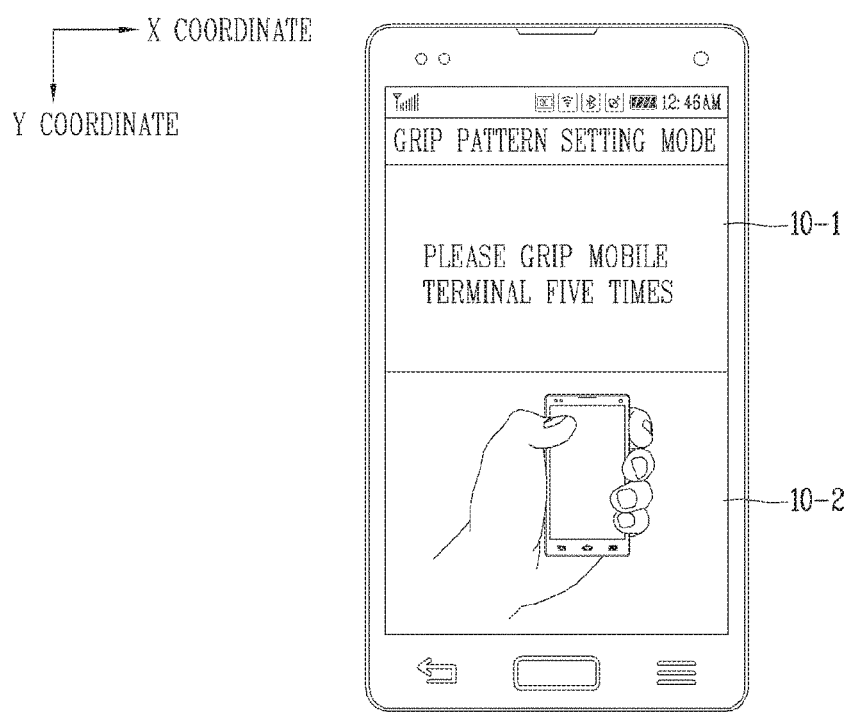
FIG. 10 is a diagram illustrating a grip pattern setting mode according to the fourth embodiment of the present invention.

FIG. 10 is a diagram illustrating the grip pattern setting mode according to the fourth embodiment of the present invention.

As illustrated in FIG. 10, when the grip pattern setting mode is selected by the user, the controller 180 displays (reproduces) on the display unit 151 information 10-1 that requests the user to grip the mobile terminal 100 a pre-set number of times (for example, one time to five times or more) in order to set (store) the grip pattern including the regions of the touch screen, which are touched on when the user grips the mobile terminal 100, and a moving image sample 10-2 in which the mobile terminal 100 is gripped and released. Therefore, the user can easily perform a grip pattern setting process while viewing the moving image sample 10-2.

The controller 180 sets the grip pattern through the grip pattern setting mode (S41).

Figure 11:
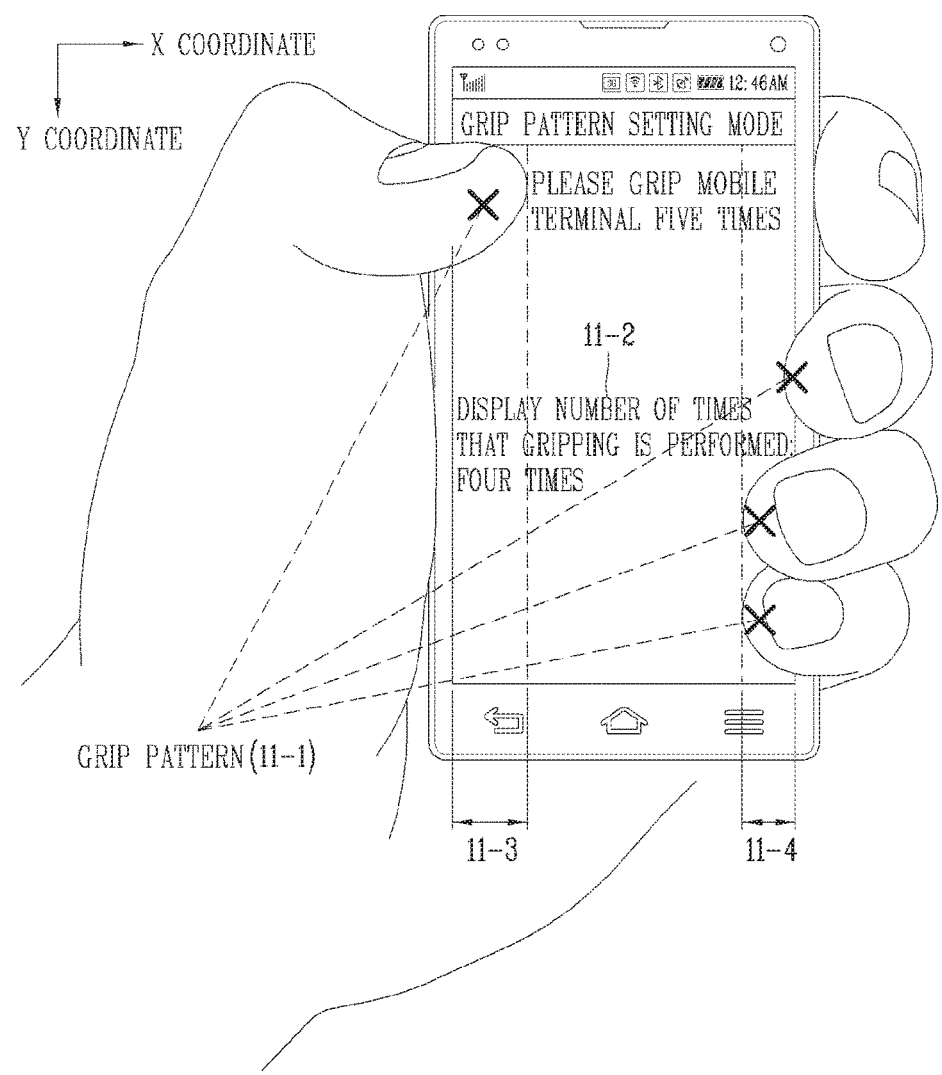
FIG. 11 is a diagram illustrating a grip pattern according to the fourth embodiment of the present invention.

FIG. 11 is a diagram illustrating the grip pattern according to the fourth embodiment of the present invention.

As illustrated in FIG. 11, when the user grips the mobile terminal 100 in the grip pattern setting mode, the controller 180 sets (recognizes) as the grip pattern the touched-on regions of the touch screen. For example, when the first bezel region (for example, the left side region of the bezel) of the touch screen is touched on by a user's thumb and the second bezel region (for example, the right side region of the bezel) of the touch screen is touched on at least one or more of the user's other fingers, the controller 180 sets (recognizes) the touched-on regions of the first bezel region and the second bezel region as the grip pattern. When the users grips the mobile terminal 100, the first bezel region is single-touched and the second bezel region is multi-touched. That is, the controller 180 sets as information on the grip pattern the touch information on the touched-on single regions of the first bezel region, and the touch information on the touched-on multi-regions of the second bezel region.

Here, depending on a user's grip habit, only the first bezel region may be touched on without touching on the first bezel region, and only the first bezel region may be touched on without touching on the second bezel region. At this point, the controller 180 sets (recognizes) as the grip pattern the touched-on regions of the first bezel region (for example, the left-side region of the bezel) and/or the second bezel region of the touch screen.

Each time the touch screen is gripped in the grip pattern setting mode by the user, the controller 180 displays the number of times 11-2 that the gripping is performed.

If the user grips the mobile terminal 100 a pre-set number of times (for example, five times) in the grip pattern setting mode, when the first bezel region is touched on five times, the controller 180 stores in the memory 160 the touch information (an averaged coordinate value of the five touched-on regions) relating to a region averaged among the five touched-on regions or the touch information (a maximum coordinate value covering all the five touched-on regions) relating to the largest region among the five touched-on regions.

If the user grips the mobile terminal 100 a pre-set number of times (for example, five times) in the grip pattern setting mode, when the second bezel region is touched on five times by the three fingers, the controller 180 stores in the memory 160 the touch information (an averaged coordinate value of the five touched-on regions) relating to a region averaged among the five regions touched on by a first finger among the three fingers or the touch information (a maximum coordinate value covering all the five touched-on regions) relating to the largest region among the five touched-on regions. Then, the controller 180 stores in the memory 160 the touch information (an averaged coordinate value of the five touched-on regions) relating to a region averaged among the five regions touched on by a second finger among the three fingers or the touch information (a maximum coordinate value covering all the five touched-on regions) relating to the largest region among the five touched-on regions. Then, the controller stores in the memory 160 the touch information (an averaged coordinate value of the five touched-on regions) relating to a region averaged among the five regions touched on by a third finger among the three fingers or the touch information (a maximum coordinate value covering all the five touched-on regions) relating to the largest region among the five touched-on regions. The controller 180 sets (recognizes) as the grip pattern the touch information that is stored in the memory 160.

When the first bezel region is touched on five times in the grip pattern setting mode, the controller 180 sets as a new first bezel region 11-3 a region from an averaged center value of the five touched-on regions or a maximum value (the largest x coordinate value of the five touched-on regions) of the five touched-on regions to an outer edge of the first bezel region.

When the second bezel region is touched on five times by the three fingers in the grip pattern setting mode, the controller 180 sets as a new second bezel region 11-4 a region from an averaged center value of the five touched-on regions or a maximum value (the largest x coordinate value of the five touched-on regions) of the five touched-on regions to an outer edge of the first bezel region.

The controller 180 pre-sets the grip pattern and then determines whether the touch input is received (S42). For example, the controller 180 determines whether a specific region of the touch screen is touched on by the user.

The controller 180 determines whether the touch information corresponding to the received touch input is the same as or similar to the grip pattern (S43).

When the touch information corresponding to the received touch input is the same as or similar to the grip pattern, the controller 180 effectively prevents the touch-caused malfunction of the touch screen by blocking the touch information corresponding to the touch input (S44).

When the touch information corresponding to the received touch input is not the same as or is not similar to the grip pattern, the controller 180 outputs the touch information corresponding to the touch input (S45). For example, when the touch information corresponding to the received touch input is different from the grip pattern, the controller 180 outputs the touch information corresponding to the touch input to the touch control unit.

Figure 12:
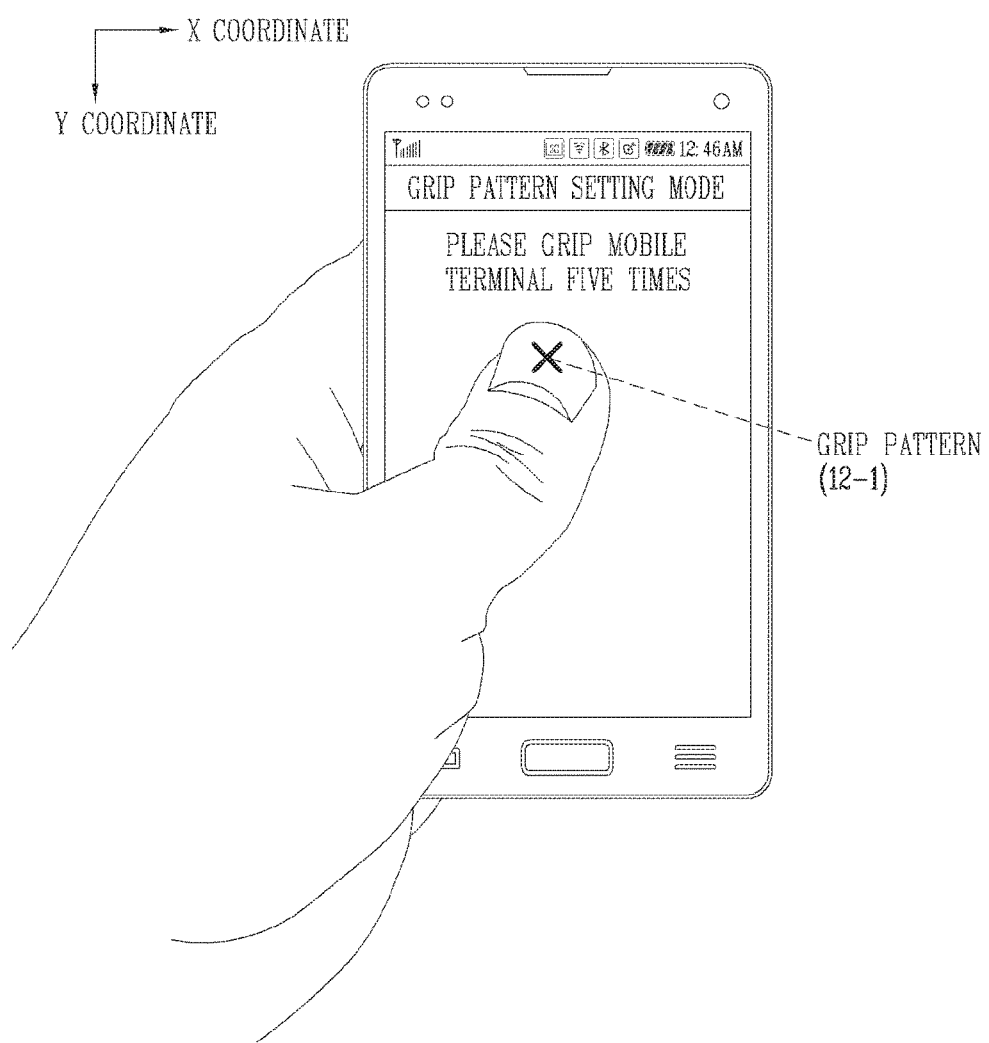
FIG. 12 is a different diagram illustrating the grip pattern according to the fourth embodiment of the present invention.

FIG. 12 is a different diagram illustrating the grip pattern according to the fourth embodiment of the present invention.

As illustrated in FIG. 12, when the user grips the mobile terminal 100 in the grip pattern setting mode, the controller 180 sets (recognizes) as the grip pattern 12-1 the region (a touch position and a touch area) of the touch screen. For example, when a specific region of the touch screen (for example, a center region) is touched on (is gripped) by a user's thumb, the controller 180 sets (recognizes) the touched-on region as the grip pattern.

If the user grips the mobile terminal 100 a pre-set number of times (for example, five times) in the grip pattern setting mode, when the center region of the touch screen is touched on five times, the controller 180 sets (recognizes) as the grip pattern the touch information (an averaged coordinate value of the five touched-on regions) relating to a region averaged among the five touched-on regions (five touch areas from a touch point to a touch ending point) or the touch information (a maximum coordinate value covering all the five touched-on regions) relating to the largest region of the five touched-on regions.

Therefore, in the device for controlling the mobile terminal according to the fourth embodiment of the present invention and the method of controlling the mobile terminal, when the grip pattern with respect to the touch screen is pre-set and the touch input is the same as or similar to the grip pattern, the touch-caused malfunction that occurs because when the user grips the mobile terminal 100 a specific region of the touch screen is touched on is effectively prevented by blocking the touch information corresponding to the touch input.

A device for controlling a mobile terminal according to a fifth embodiment of the present invention, which is capable of preventing a touch-caused malfunction that occurs because when the user grips the mobile terminal a specific region of a touch screen is touched on, and a method of controlling the mobile terminal are described below referring to FIGS. 9 to 14.

Figure 13:
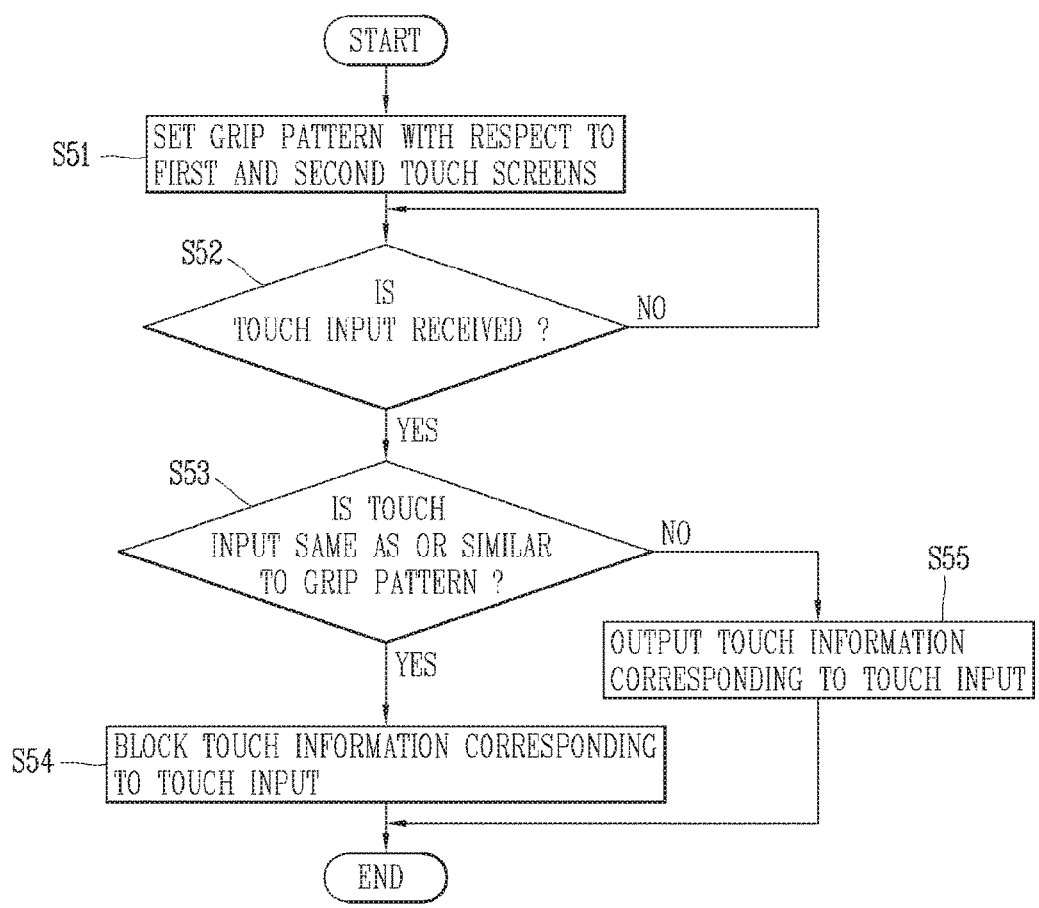
FIG. 13 is a flowchart illustrating a method of controlling a mobile terminal according to a fifth embodiment of the present invention.

FIG. 13 is a flowchart illustrating the method of controlling the mobile terminal 100 according to the fifth embodiment of the present invention.

First, when a grip pattern setting mode is selected by the user, the controller 180 displays a grip pattern setting screen for setting a grip pattern on the display unit 151. When the grip pattern setting mode is selected by the user, the controller 180 displays (reproduces) on the display unit 151 information that requests the user to grip the mobile terminal 100 a pre-set number of times (for example, one time to five times or more) in order to set (store) the grip pattern including the regions of the touch screen, which are touched on when the user grips the mobile terminal 100, and a moving image sample in which the mobile terminal 100 is gripped and released. There, the user can easily perform a grip pattern setting process while viewing the moving image sample 10-2.

The controller 180 sets the grip pattern through the grip pattern setting mode (S51).

Figure 14:
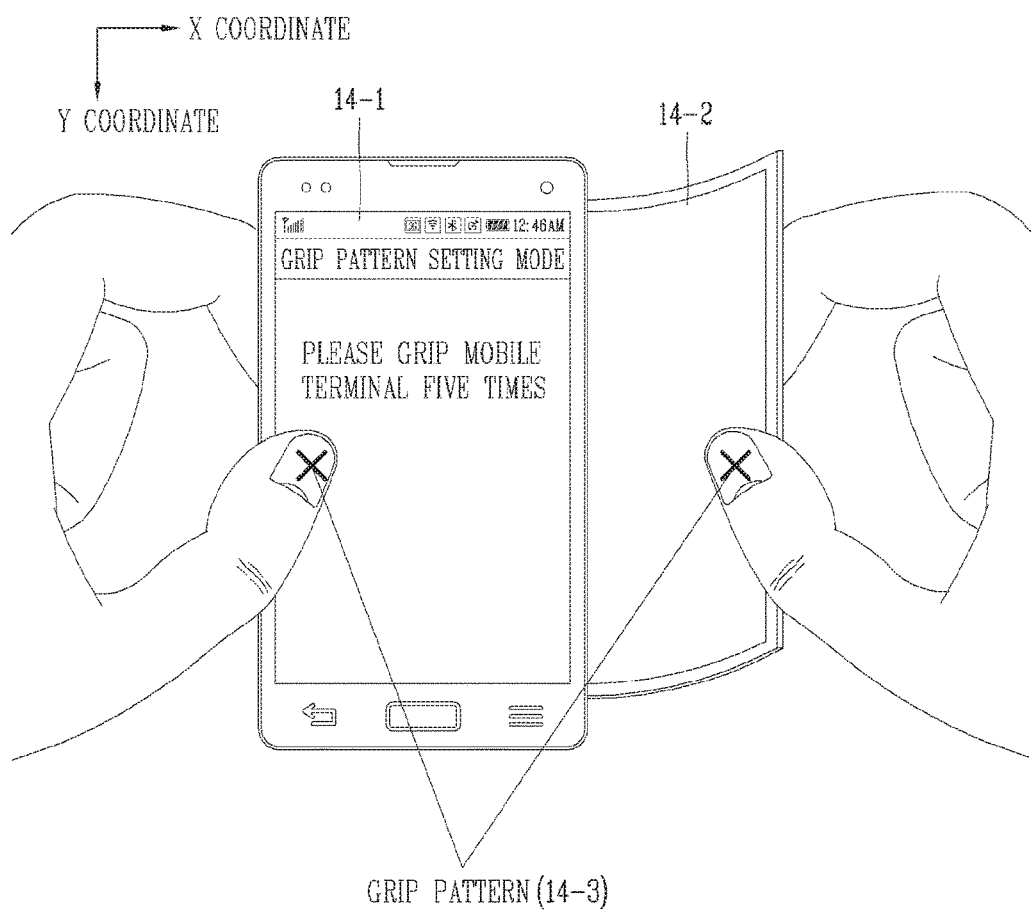
FIG. 14 is a diagram illustrating a grip pattern according to the fifth embodiment of the present invention.

FIG. 14 is a diagram illustrating the grip pattern according to the fifth embodiment of the present invention.

As illustrated in FIG. 14, the touch screen is configured to include a first touch screen 14-1 that is applied to a first display unit 151 and a second touch screen 14-2 that is applied to a flexible display. The flexible display is laterally inserted into a space within the lateral side of the mobile terminal 100 or is drawn outside. The touch screen is configured to include the first touch screen and the second touch screen that are applied to a dual display unit and the dual display unit is a folder type (bendable).

When the user grips the mobile terminal 100 in the grip pattern setting mode, the controller 180 sets (recognizes) as a grip pattern 14-3 the touched-on regions of the first and second touch screens. For example, when the first bezel region (for example, the left side region of the bezel) of the first touch screen 14-1 is touched on by a thumb on the user's left hand and the second bezel region (for example, the right side region of the bezel) of the second touch screen 14-2 is touched on by a thumb on the user's right hand, the controller 180 sets (recognizes) the touched-on regions of the first bezel region and the second bezel region as the grip pattern 14-3. When the users grips the dual display of the mobile terminal 100, the first bezel region is single-touched and the second bezel region also is single-touched. That is, the controller 180 sets as information on the grip pattern 14-3 the touch information on the touched-on single region of the first bezel region, and the touch information on the touched-on single region of the second bezel region.

If the user grips the mobile terminal 100 a pre-set number of times (for example, five times) in the grip pattern setting mode, when the first bezel region is touched on five times, the controller 180 stores in the memory 160 the touch information (an averaged coordinate value of the five touched-on regions) relating to a region averaged among the five touched-on regions or the touch information (a maximum coordinate value covering all the five touched-on regions) relating to the largest region among the five touched-on regions.

If the user grips the mobile terminal 100 a pre-set number of times (for example, five times) in the grip pattern setting mode, when the second bezel region is touched on five times, the controller 180 stores in the memory 160 the touch information (an averaged coordinate value of the five touched-on regions) relating to a region averaged among the five touched-on regions or the touch information (a maximum coordinate value covering all the five touched-on regions) relating to the largest region among the five touched-on regions. The controller 180 sets (recognizes) as the grip pattern the touch information that is stored in the memory 160.

When the first bezel region is touched on five times in the grip pattern setting mode, the controller 180 sets as a new first bezel region a region from an averaged center value of the five touched-on regions or a maximum value (the largest x coordinate value of the five touched-on regions) of the five touched-on regions to an outer edge of the first bezel region.

When the second bezel region is touched on five times in the grip pattern setting mode, the controller 180 sets as a new second bezel region a region from an averaged center value of the five touched-on regions or a maximum value (the largest x coordinate value of the five touched-on regions) of the five touched-on regions to an outer edge of the second bezel region.

The controller 180 pre-sets the grip pattern and then determines whether the touch input is received (S52). For example, the controller 180 determines whether a specific region of the touch screen is touched on by the user.

The controller 180 determines whether the touch information corresponding to the received touch input is the same as or similar to the grip pattern (S53).

When the touch information corresponding to the received touch input is the same as or similar to the grip pattern, the controller 180 effectively prevents the touch-caused malfunction of the touch screen by blocking the touch information corresponding to the touch input (S54).

When the touch information corresponding to the received touch input is not the same as or is not similar to the grip pattern, the controller 180 outputs the touch information corresponding to the touch input (S55). For example, when the touch information corresponding to the received touch input is different from the grip pattern, the controller 180 outputs the touch information corresponding to the touch input to the touch control unit.

Therefore, in the device for controlling the mobile terminal according to the fifth embodiment of the present invention and the method of controlling the mobile terminal, when the grip pattern with respect to the first and second touch screens is pre-set and the touch input is the same as or similar to the grip pattern, the touch-caused malfunction that occurs because when the user grips the mobile terminal 100 a specific region of the touch screen is touched on is effectively prevented by blocking the touch information corresponding to the touch input.

Figure 15:
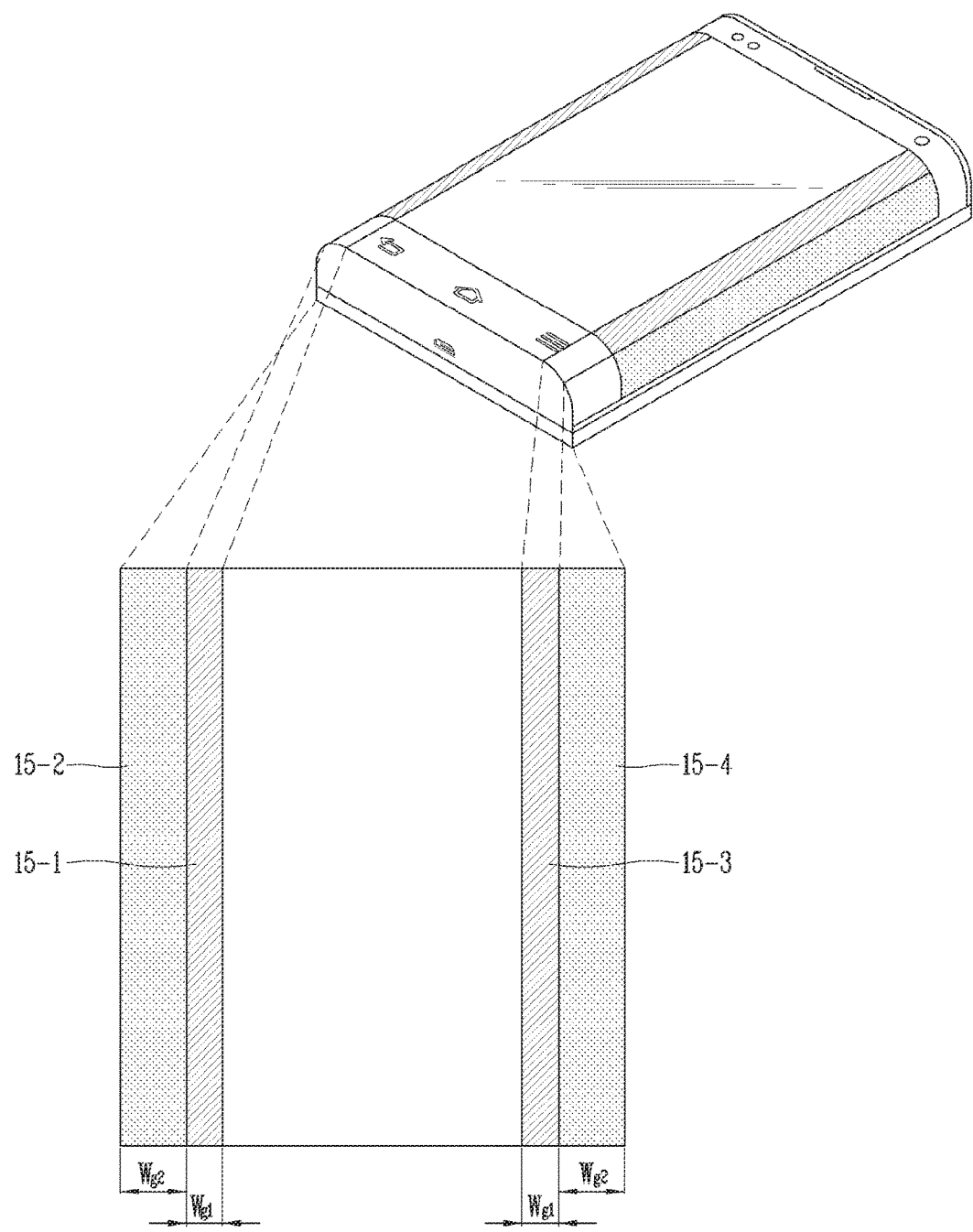
FIG. 15 is a diagram illustrating a touch screen of a mobile terminal according to a sixth embodiment of the present invention.
Figure 16:
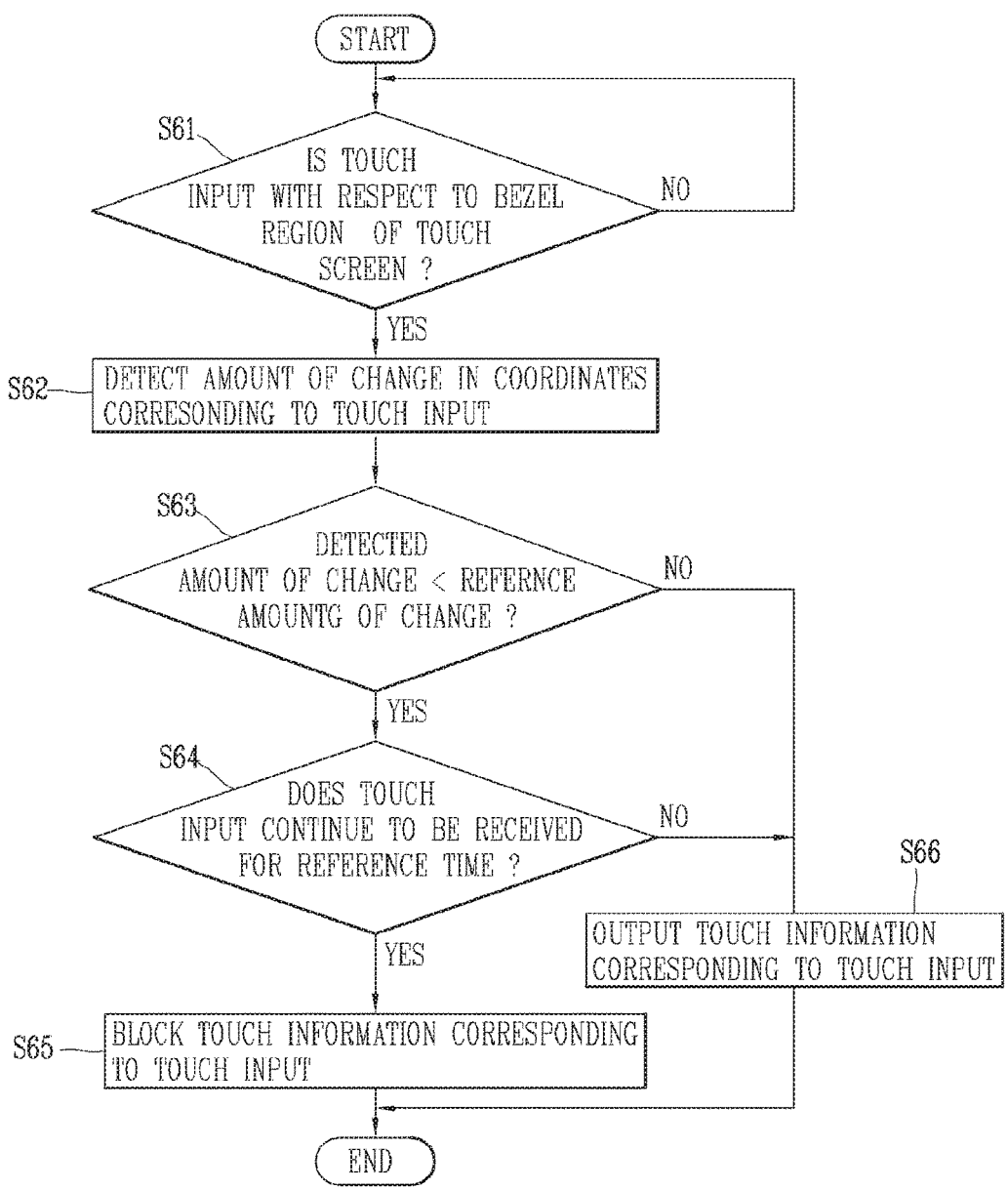
FIG. 16 is a flowchart illustrating a method of controlling the mobile terminal according to the sixth embodiment of the present invention.

A device for controlling a mobile terminal 100 according to a sixth embodiment of the present invention, in which the flexible display (including the touch screen) extending from the front side of the mobile terminal 100 to the lateral side is applied to the mobile terminal 100 and which is capable of preventing the touch-caused malfunction that occurs because when the user grips the mobile terminal 100 a specific region of the touch screen is touched on, and a method of controlling the mobile terminal are described referring to FIG. 15 and FIG. 16.

FIG. 15 is a diagram illustrating a touch screen of the mobile terminal 100 according to the sixth embodiment of the present invention.

As illustrated in FIG. 15, the touch screen of the mobile terminal 100 extends from the front side of the mobile terminal 101 to the lateral side. The bezel region of the touch screen is defined as a first bezel region 15-1, a second bezel region 15-2, a third bezel region 15-3, and a fourth bezel region 15-4. The first bezel region 15-1 is positioned on the left of the front side. The second bezel region 15-2 is positioned on the left lateral side of the touch screen. The third bezel region 15-3 is positioned on the right of the front side. The fourth bezel region 15-4 is positioned on the right lateral side. The first bezel region 15-1 and the third bezel region 15-3 have the same width or different widths. The second bezel region 15-2 and the fourth bezel region 15-4 have the same width or different widths. The widths of the first bezel region 15-1 and the third bezel region 15-3 are smaller or larger than those of the second bezel region 15-2 and the fourth bezel region 15-4.

In addition, the bezel region of the touch screen may define the first bezel region 15-1 and the second bezel region 15-2 as one bezel region and may define the third bezel region 15-3 and the fourth bezel region 15-4 as another bezel region. The width Wg1 and Wg2 of the first to fourth bezel regions 15-1 to 5-4 are pre-set by the product designer and are set by the user.

FIG. 16 is a flowchart illustrating the method of controlling the mobile terminal 100 according to the sixth embodiment of the present invention.

First, the controller 180 determines whether a touch input with respect to a bezel region of a touch screen is received (S61). For example, the controller 180 determines whether one region or two or more regions among the first to fourth bezel regions 15-1 and 15-4 of the touch screen are touched on by the user.

When the touch input with respect to the bezel region of the touch screen is received, the controller 180 detects an amount of change in coordinates corresponding to the touch input (S62). For example, the controller 180 determines whether a specific point/specific points on one region or two or more regions among the first to fourth bezel regions 15-1 to 15-4 of the touch screen continues to be touched on by the user or the specific point(s) is (are) moved in a specific direction in a state in which the specific point(s) is (are) touched on by the user. That is, when the user grips the mobile terminal 100, the state in which the specific point(s) on the specific point on the bezel region of the touch screen is (are) touched on by the user continues to be maintained for given time, and thus the amount of change in coordinates corresponding to the touch input is not present or is too small.

The controller 180 determines whether the detected amount of change is equal to or less than a pre-set reference amount of change (S63). For example, the controller 180 determines whether the specific point continues to be touched on without any movement by the user. The pre-set reference amount of change is "0," or is changed to various values by the user.

The controller 180 determines (decides) whether the touch input continues to be received for pre-set reference time for which a state in which the mobile terminal 100 is gripped by the user is recognized (S64). For example, the controller 180 determines whether the specific points(s) on one or more regions among the first to fourth bezel regions 15-1 and 15-4 of the touch screen is (are) touched on for the pre-set time by the user. That is, when the user grips the mobile terminal 100, the specific points on the bezel regions of the touch screen are touched on by the user and generally the touched state continues to be maintained for given time. The pre-set time is pre-set by the product designer and is changed by the user.

When the touch input continues to be received for the pre-set time, the controller 180 blocks the touch information (the touch information) corresponding to the touch input (S65). For example, when the touch input continues to be received for the pre-set reference time for which the state in which the mobile terminal 100 is gripped by the user is recognized and the detected amount of change is equal to or less than the pre-set reference amount of change, the controller 180 blocks the touch information corresponding to the touch input. That is, when the touch input is received without any meaningful movement for the pre-set reference time, the controller 180 prevents the touch-caused malfunction due to the gripping of the touch screen by blocking the touch information corresponding to that touch input.

When a duration of the touch input is smaller than the pre-set time, the controller 180 outputs the touch information corresponding to the touch input (S66). For example, when the touch input is received one time, or does not continue to be received, the controller 180 outputs the touch information corresponding to the touch input to the touch control unit.

The controller 180 may determine whether when the user grips the mobile terminal 100, a touch area (for example, an x coordinate value) corresponding to the touch input is equal to or more than a reference area (for example, 20 pixels) of the bezel region of the touch screen, which has to be touched on by a user's finger. The reference area is an area of the bezel region of the touch screen, which, when the user grips the mobile terminal 100, has to be touched on, and can be re-set by the user.

When the touch input continues to be received for the pre-set reference time for which the state in which the mobile terminal 100 is gripped by the user is recognized and the detected amount of change is equal to or less than the pre-set reference amount of change and a touch area corresponding to the touch input is equal to or more than the reference area, the controller 180 may block the touch information corresponding to the touch input. Conversely, when the touch input continues to be received for the pre-set reference time for which the state in which the mobile terminal 100 is gripped by the user is recognized and the detected amount of change is equal to or less than the pre-set reference amount of change and a touch area corresponding to the touch input is less than the reference area, the controller 180 may output the touch information corresponding to the touch input.

When the user grips the mobile terminal 100 a pre-set number of times (for example, five times) in the grip pattern setting mode, the controller 180 may set (recognize) the touch points on the bezel regions 15-1 and 15-4 as the grip pattern, and when the touch input is the same as or similar to the grip pattern, may block the touch information corresponding to the touch input.

When an X-axis coordinate value of a touch point corresponding to the touch input is smaller than the second bezel region 15-2 (or the fourth bezel region 15-4) of the touch screen or is larger than a region that results from excluding the second bezel region 15-2 (or the fourth bezel region 15-4) of the touch screen from the width of the touch screen, the controller 180 stores coordinates of the touch corresponding to the touch point in the memory 160.

The controller 180 stores coordinates of the touch corresponding to the touch point in the memory 160 when an X-axis coordinate value of the touch point corresponding to the touch input is larger than the second bezel region 15-2 (or the fourth bezel region 15-4) of the touch screen, or is smaller than a region that results from excluding the second bezel region 15-2 (or the fourth bezel region 15-4) of the touch screen from the width of the touch screen, and when the X-axis coordinate value of the touch point corresponding to the touch input is smaller than the first bezel region 15-1 (or the third bezel region 15-3) of the touch screen or is larger than a region that results from excluding the first bezel region 15-1 (or the third bezel region 15-3) of the touch screen from the width of the touch screen.

Conversely, the controller 180 may store the coordinates of the touch corresponding to the touch point when the X-axis coordinate value of the touch point corresponding to the touch input is larger than the second bezel region 15-2 (or the fourth bezel region 15-4) of the touch screen, or is smaller than the region that results from excluding the second bezel region 15-2 (or the fourth bezel region 15-4) of the touch screen from the width of the touch screen, and when the X-axis coordinate value of the touch point corresponding to the touch input is larger than the first bezel region 15-1 (or the third bezel region 15-3) of the touch screen or is smaller than a region that results from excluding the first bezel region 15-1 (or the third bezel region 15-3) of the touch screen from the width of the touch screen.

Therefore, in the device for controlling the mobile terminal according to the sixth embodiment of the present invention and the method of controlling the mobile terminal, the touch-caused malfunction is prevented which occurs because a specific region of the touch screen is touched on when the user grips the mobile terminal 100 including the flexible display (including the touch screen) that extends from the front side of the mobile terminal 100 to the lateral side.

Figure 17:
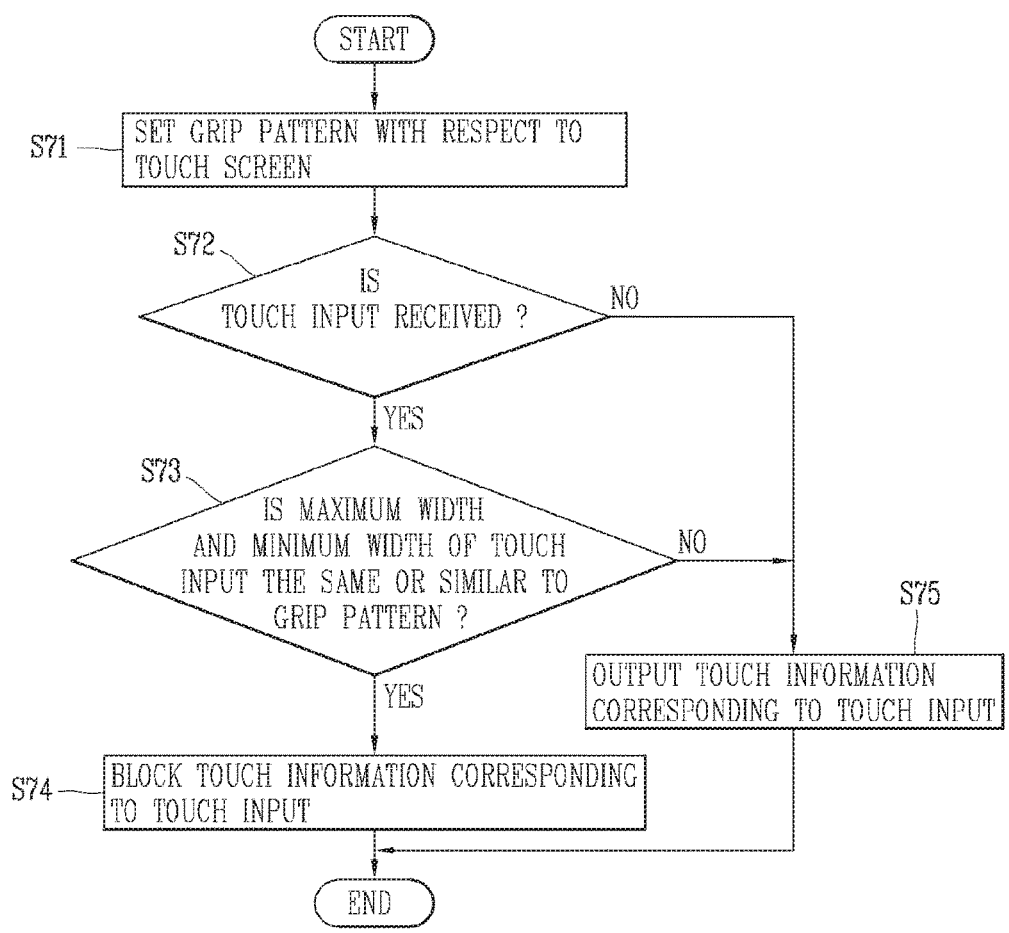
FIG. 17 is a flowchart illustrating a method of controlling a mobile terminal according to a seventh embodiment of the present invention.

FIG. 17 is a flowchart illustrating a method of controlling a mobile terminal 100 according to a seventh embodiment of the present invention.

First, the controller 180 determines whether a touch input with respect to a bezel region 4-1 of a touch screen is received (S71). For example, the controller 180 determines a specific point (coordinates) on the bezel region 4-1 of the touch screen is touched on by the user.

The controller 180 detects a minimum width (a minimum value) and a maximum width (a maximum value) of the touch region (a touch area) corresponding to the touch input (S72).

The controller 180 decides (determines) whether a difference between the detected minimum width and maximum width is equal to or more than the pre-set reference value (S73)

When the difference between the detected minimum width and maximum width is equal to or more than a pre-set reference value, the controller 180 determines that the mobile terminal 100 is in a state of being gripped by the user. For example, when the difference between the detected minimum width and maximum width is equal to or more than the pre-set reference value, the controller 180 prevents the touch-caused malfunction of the touch screen by blocking the touch information corresponding to the touch input (S74). That is, the touch-caused malfunction is prevented which occurs because when the user grips the mobile terminal 100 the bezel region of the touch screen is touched on.

Figure 18:
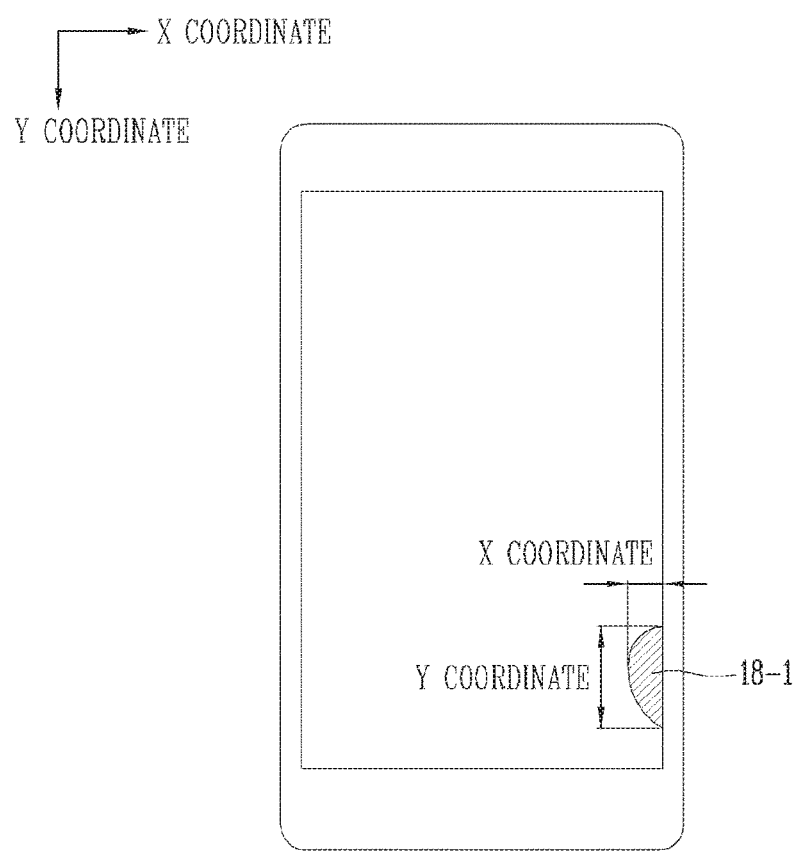
FIG. 18 is a diagram illustrating a touch region (a touch area) that results when the mobile terminal is gripped by the user.

FIG. 18 is a diagram illustrating the touch region (the touch area) that results when the mobile terminal 100 is gripped by the user.

As illustrated in FIG. 18, if it is assumed that when the user grips the mobile terminal 100, the bezel region of the touch screen is touched on, there is a big difference between an X-axis width and a Y-axis width of the touched region 18-1 of the bezel region. Therefore, the controller 180 detects the minimum width (the minimum-width value) (the X-axis width) and the maximum width (the maximum-width value) (the Y-axis width) of the touch region (the touch area) 18-1 corresponding to the touch input. Then, when the difference between the detected minimum width and maximum width is equal to or more than the pre-set reference value, the controller 180 determines that the mobile terminal 100 is in the state of being gripped by the user.

The pre-set reference value, as a reference value for determining whether or not the mobile terminal 100 is gripped by the user, is a predetermined difference in value between the minimum width and the maximum width of the touch region (the touch area) that corresponds to the touch input with respect to the bezel region 4-1 of the touch screen when the mobile terminal 100 is in the state of being gripped by the user. For example, when the predetermined minimum width and the predetermined maximum width are assumed to be 0.5 mm and 1 mm, respectively, the pre-set reference value is 0.5 mm or more. The pre-set reference value can be changed by the user.

When the detected maximum width is equal to or more than pre-set number times (for example, 1.5 times) the minimum width, it is determined that the mobile terminal 100 is in the state of being gripped by the user. The pre-set number can be changed by the user.

When the difference between the detected minimum width and maximum width is less than the pre-set reference value, the controller 180 outputs the touch information corresponding to the touch input (S75). For example, when the difference between the detected minimum width and maximum width is less than the pre-set reference value, the controller 180 outputs the touch information corresponding to the touch input to the touch control unit.

When the detected maximum width is less than pre-set number times (for example, 1.5 times) the minimum width, the mobile terminal 100 determines that the mobile terminal 100 is not in the state of being gripped by the user.

Figure 19:
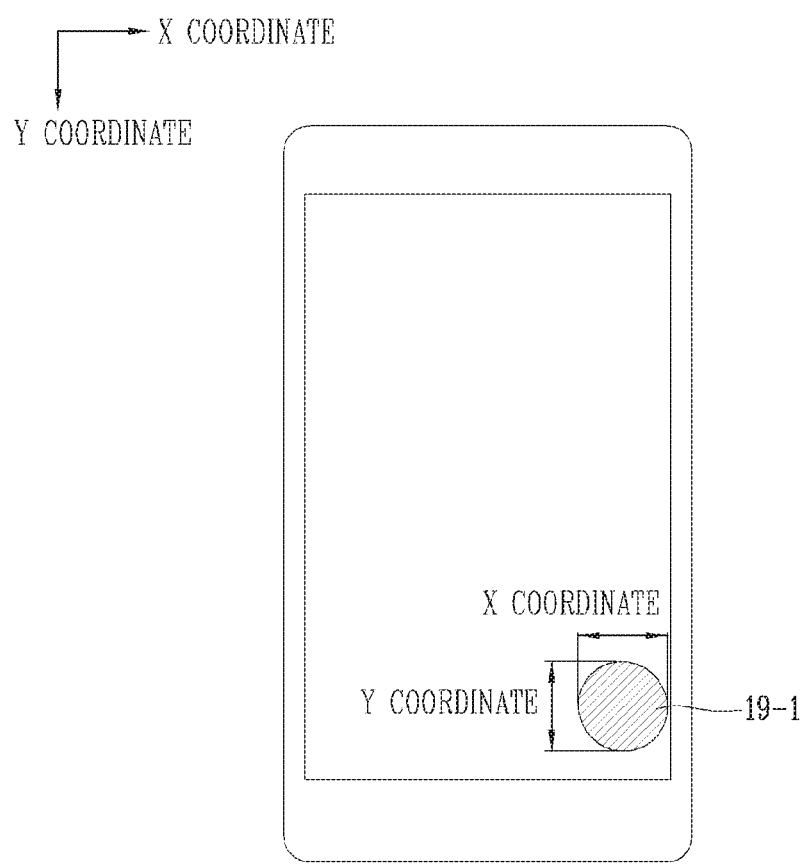
FIG. 19 is a diagram illustrating the touch region (the touch area) that results when the user intentionally touches on the bezel region of the touch screen.

FIG. 19 is a diagram illustrating the touch region (the touch area) that results when the user intentionally touches on the bezel region of the touch screen.

As illustrated in FIG. 19, when the user touches on the bezel region in order to intentionally select content displayed on the bezel region, the X-axis width and the Y-axis width of that touch region (the touch area) are displayed in such a manner that they are the same or are similar to each other. Therefore, the controller 180 detects the minimum width (the X-axis width) and the maximum width (the Y-axis width) of the touch region (the touch area) 18-1 or 19-1 corresponding to the touch input. Then, when the difference between the detected minimum width and maximum width is less than the pre-set reference value, the controller 180 determines that the user intentionally selects the content displayed on the bezel region.

When the detected maximum width is less than pre-set number times (for example, 1.5 times) the minimum width, the mobile terminal 100 determines that the user intentionally selects the content displayed on the bezel region.

When the touch input with respect to the bezel region continues to be received for pre-set time and at the same time the difference between the detected minimum width and maximum width is equal to or more than the pre-set reference value, the controller 180 may prevent the touch-caused malfunction of the touch screen by blocking the touch information corresponding to the touch input. That is, when the user grips the mobile terminal 100, the specific point on the bezel region 4-1 of the touch screen is touched on by the user and generally the touched state continues to be maintained for given time. The pre-set time is pre-set by the product designer and is changed by the user.

Therefore, in the device for controlling the mobile terminal according to the seventh embodiment of the present invention and the method of controlling the mobile terminal, the touch-caused malfunction that occurs because when the user grips the mobile terminal 100 the bezel region of the touch screen is touched on is prevented by blocking the touch information corresponding to the touch input, based on the width of the touch region (the touch area) corresponding to the touch input with respect to the bezel region.

Figure 20:
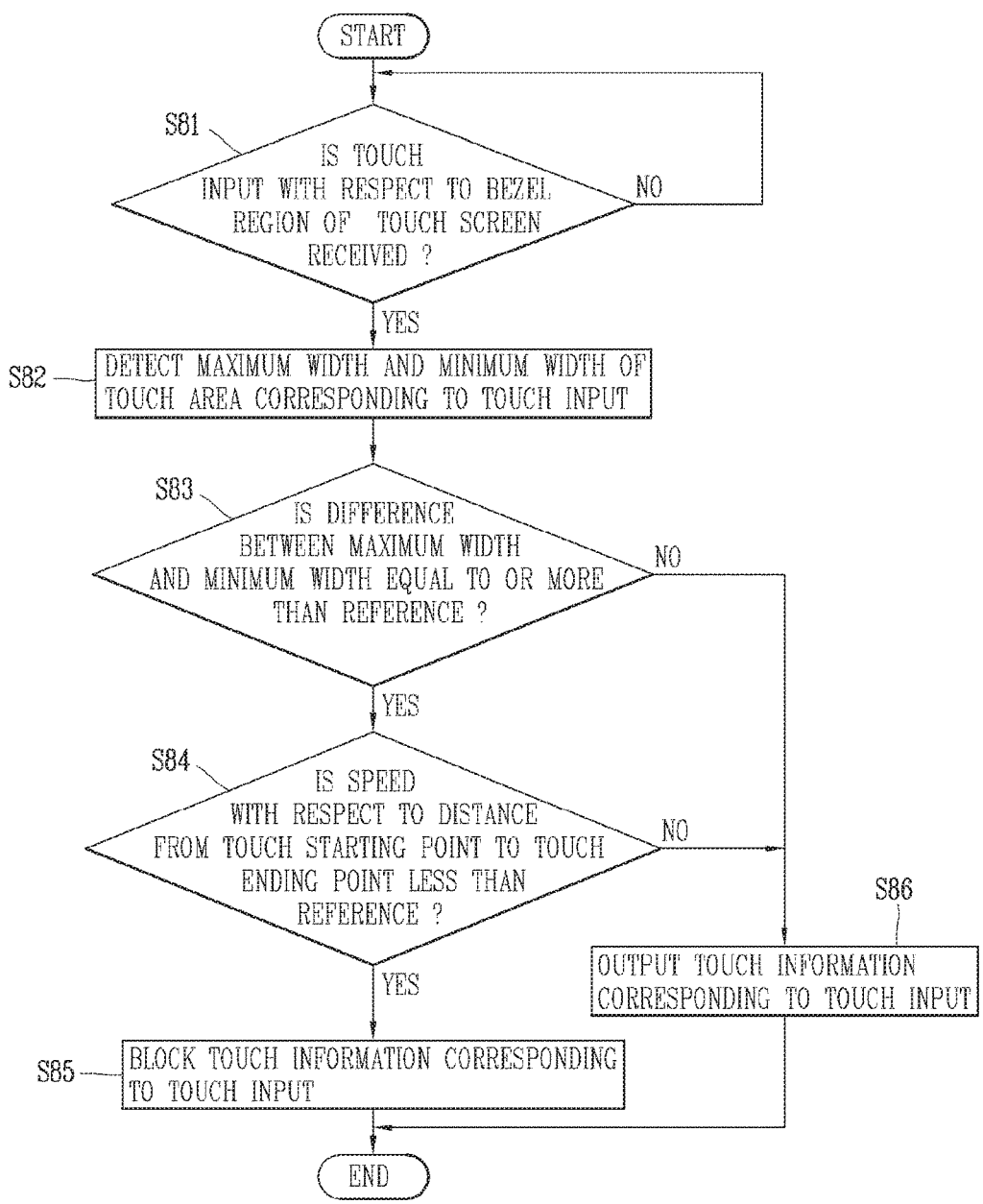
FIG. 20 is a flowchart illustrating a method of controlling a mobile terminal according to an eighth embodiment of the present invention.

FIG. 20 is a flowchart illustrating a method of controlling a mobile terminal 100 according to an eighth embodiment of the present invention.

First, the controller 180 determines whether a touch input with respect to a bezel region 4-1 of a touch screen is received (S81). For example, the controller 180 determines a specific point (coordinates) on the bezel region 4-1 of the touch screen is touched on by the user.

The controller 180 detects a minimum width (a minimum value) and a maximum width (a maximum value) of the touch region (a touch area) corresponding to the touch input (S72)

The controller 180 decides (determines) whether a difference between the detected minimum width and maximum width is equal to or more than the pre-set reference value (S83). The pre-set reference value, as a reference value for determining whether or not the mobile terminal 100 is gripped by the user, is a predetermined difference in value between the minimum width and the maximum width of the touch region (the touch area) that corresponds to the touch input with respect to the bezel region 4-1 of the touch screen when the mobile terminal 100 is in the state of being gripped by the user. For example, when the predetermined minimum width and the predetermined maximum width are assumed to be 0.5 mm and 1 mm, respectively, the pre-set reference value is 0.5 mm or more. The pre-set reference value can be changed by the user.

When the difference between the detected minimum width and maximum width is equal to or more than the pre-set reference value, the controller 180 detects a speed with respect to a distance from a touch starting point corresponding to the touch input to a touch ending point. For example, the controller 180 determines whether or not the mobile terminal 100 is in a state of being gripped by the user, based on the speed with respect to the distance from the touch starting point corresponding to the touch input to the touch ending point.

When the difference between the detected minimum width and maximum width is equal to or more than the pre-set reference value, the controller 180 decides (determines) whether the speed with respect to the distance from the touch starting point to the touch ending point is less than a pre-set reference speed (S84). For example, the controller 180 decides (determines) whether the speed with respect to the distance from the touch starting point to the touch ending point is less than 500 pixel/sec (the pre-set reference speed). The pre-set reference speed can be changed by the user. That is, when the speed with respect to the distance from the touch starting point to the touch ending point is less than 500 pixel/sec (the pre-set reference speed), the controller 180 determines that in a state where the mobile terminal 100 is gripped by the user, a drag operation is performed. And when the speed with respect to the distance from the touch starting point to the touch ending point is equal to or more than 500 pixel/sec (the pre-set reference speed), the controller 180 determines that the user intentionally performs the drag operation.

When the difference between the detected minimum width and maximum width is equal to or more than the pre-set reference value and the speed with respect to the distance from the touch starting point to the touch ending point is less than the pre-set reference speed, the controller 180 prevents the touch-caused malfunction of the touch screen by blocking the touch information corresponding to the touch input (S85). That is, the touch-caused malfunction is prevented which occurs because when the user grips the mobile terminal 100 the bezel region of the touch screen is touched on.

When the difference between the detected minimum width and maximum width is less than the pre-set reference value, the controller 180 outputs the touch information corresponding to the touch input (S86). For example, when the difference between the detected minimum and maximum widths is less than the pre-set reference value, the controller 180 outputs the touch information corresponding to the touch input to the touch control unit.

When the difference between the detected minimum width and maximum width is equal to or more than the pre-set reference value and the speed with respect to the distance from the touch starting point to the touch ending point is equal to or more than the pre-set reference speed, the controller 180 outputs the touch information corresponding to the touch input.

Therefore, in the device for controlling the mobile terminal according to the eighth embodiment of the present invention and the method of controlling the mobile terminal, the touch-caused malfunction that occurs because when the user grips the mobile terminal 100 the bezel region of the touch screen is touched on is prevented by blocking the touch information corresponding to the touch input, based on the width of the touch region (the touch area) corresponding to the touch input with respect to the bezel region and on the speed with respect to the distance from the touch starting point to the touch ending point.

A device for controlling a mobile terminal according to a ninth embodiment of the present invention, which is capable of preventing a touch-caused malfunction that occurs because when the user grips the mobile terminal a specific region of a touch screen is touched on, and a method of controlling the mobile terminal are described below.

Figure 21:
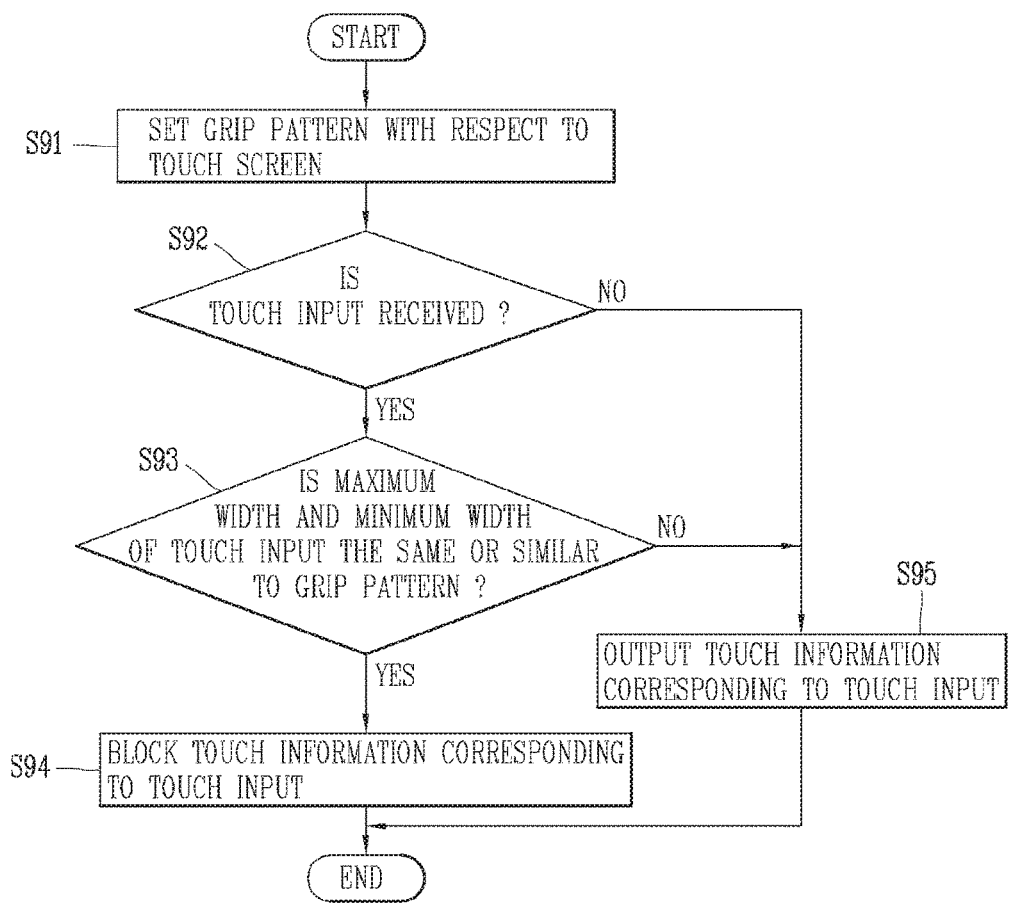
FIG. 21 is a flowchart illustrating a method of controlling a mobile terminal according to a ninth embodiment of the present invention.

FIG. 21 is a flowchart illustrating the method of controlling the mobile terminal 100 according to the ninth embodiment of the present invention.

First, when a grip pattern setting mode is selected by the user, the controller 180 displays a grip pattern setting screen for setting a grip pattern on the display unit 151.

Figure 22:
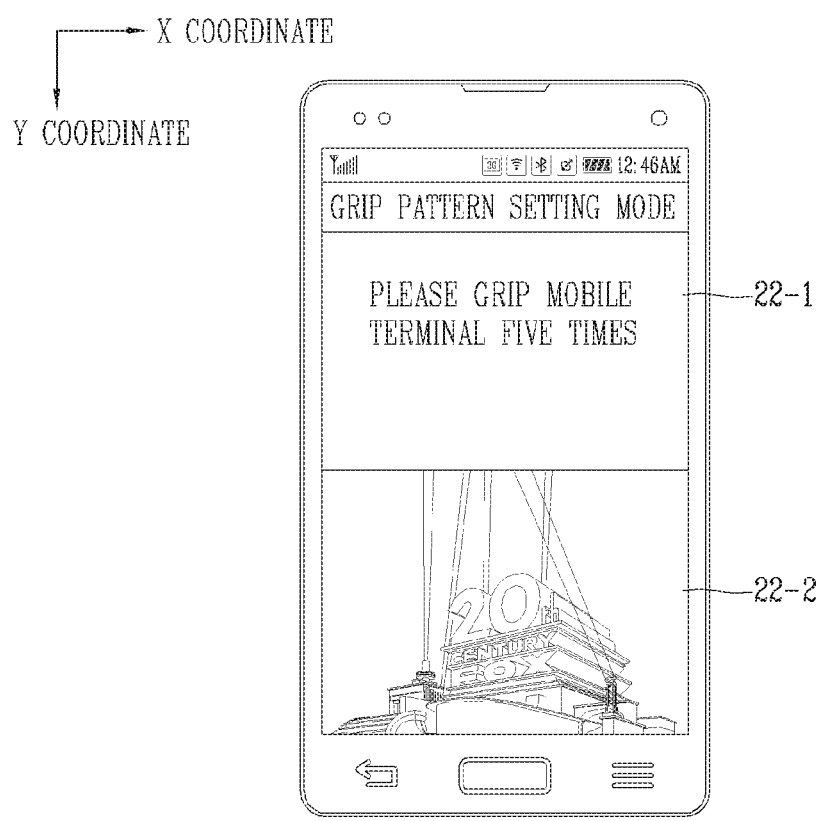
FIG. 22 is a diagram illustrating a grip pattern setting mode according to the ninth embodiment of the present invention.

FIG. 22 is a diagram illustrating the grip pattern setting mode according to the ninth embodiment of the present invention.

As illustrated in FIG. 22, when the grip pattern setting mode is selected by the user, the controller 180 displays (reproduces) on the display unit 151 information 22-1 that requests the user to grip the mobile terminal 100 a pre-set number of times (for example, one time to five times or more) in order to set (store) the grip pattern including the regions of the touch screen, which are touched on when the user grips the mobile terminal 100, and a moving image sample 22-2 in which the mobile terminal 100 is gripped and released. There, the user can easily perform a grip pattern setting process while viewing the moving image sample 22-2.

The controller 180 sets the grip pattern through the grip pattern setting mode (S91).

Figure 23:
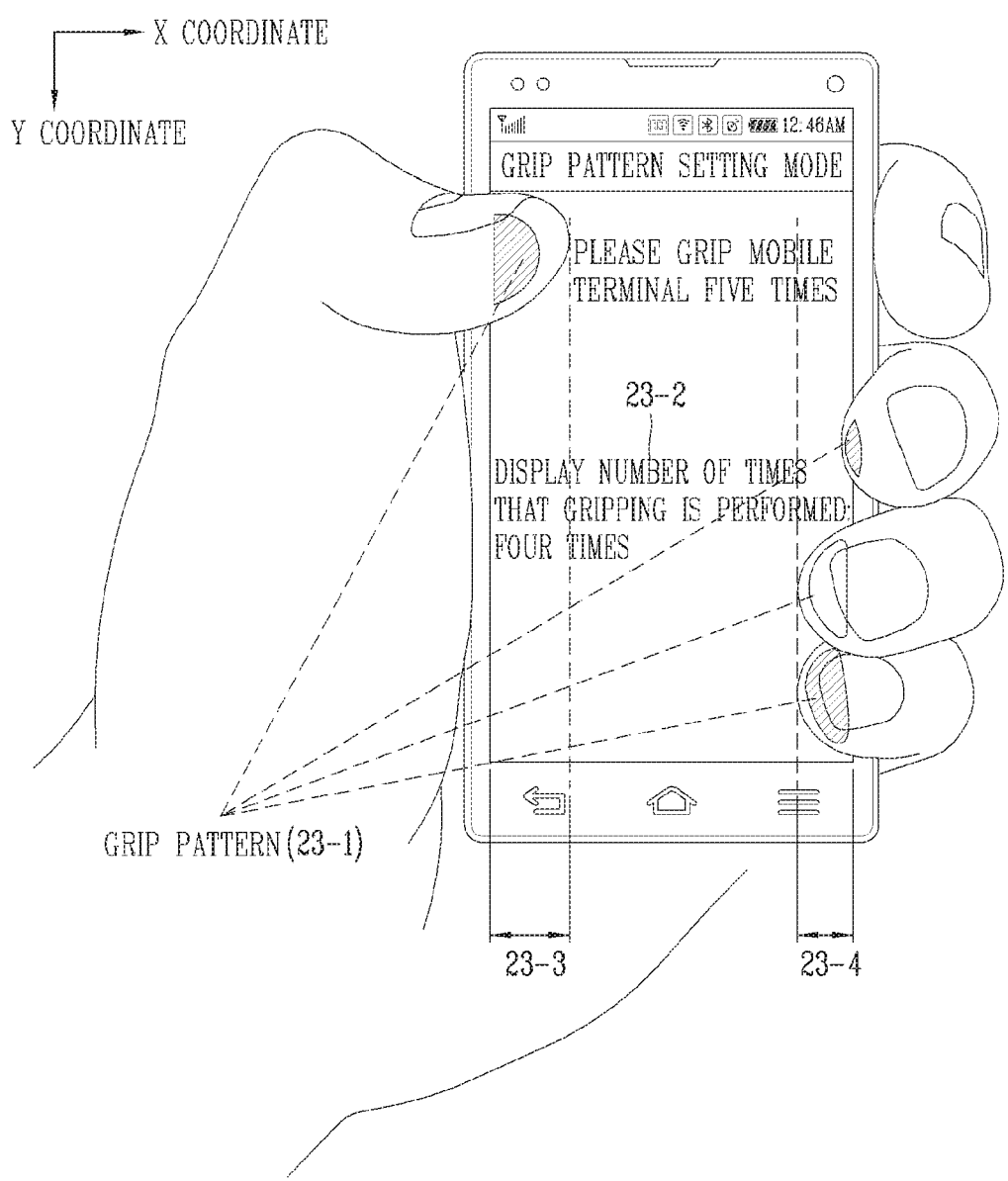
FIG. 23 is a diagram illustrating a grip pattern according to the ninth embodiment of the present invention.

FIG. 23 is a diagram illustrating the grip pattern according to the ninth embodiment of the present invention.

As illustrated in FIG. 23, when the user grips the mobile terminal 100 in the grip pattern setting mode, the controller 180 sets (recognizes) as the grip pattern the maximum width and the minimum width of the region(s) of the touch screen, which is (are) touched on. For example, when a first bezel region (for example, a left side region of the bezel) 23-3 of the touch screen is touched on by a user's thumb and a second bezel region 23-4 (for example, a right side region of the bezel) of the touch screen is touched on by at least one or more fingers among the user's other fingers, the controller 180 sets (recognizes) as the grip pattern 23-1 a first maximum width and a first minimum width (the touch information) of the touched-on region of the first bezel region 23-3 and a second maximum width and a second minimum width (the touch information) of the touched-on region(s) of the second bezel region 23-4. When the users grips the mobile terminal 100, the first bezel region is single-touched and the second bezel region is multi-touched. That is, the controller 180 sets as information on the grip pattern the touch information (the maximum width and the minimum width) on the touched-on single region of the first bezel region, and the touch information (the maximum widths and the minimum widths) on the touched-on multi-regions of the second bezel region.

Here, depending on a user's grip habit, only the first bezel region may be touched on without touching on the first bezel region, and only the first bezel region may be touched on without touching on the second bezel region. At this point, the controller 180 sets (recognizes) as the grip pattern the maximum widths and the minimum widths of the touched-on regions of the first bezel region (for example, the left-side region of the bezel) and/or the second bezel region of the touch screen.

Each time the touch screen is gripped in the grip pattern setting mode by the user, the controller 180 displays the number of times 23-2 that the gripping is performed.

If the user grips the mobile terminal 100 a pre-set number of times (for example, five times) in the grip pattern setting mode, when the first bezel region is assumed to be touched on five times, the controller 180 may store a maximum width range (for example, a range of 1 mm to 1.5 mm or more) and a minimum width range (for example, a range of 0.3 to less than 0.5 mm) of the five touched-on regions as the touch information in the memory 160.

If the user grips the mobile terminal 100 a pre-set number of times (for example, five times) in the grip pattern setting mode, when the second bezel region is assumed to be touched on five times by the three fingers, the controller 180 may store the maximum width range (for example, a range of 1 mm to 1.5 mm or more) and the minimum width range (for example, 0.3 mm to less than 0.5 mm) of the five regions that are touched on by a first finger among the three fingers, as the touch information, in the memory 160, may store the maximum width range (for example, a range of 1 mm to 1.5 mm or more) and the minimum width range (for example, 0.3 mm to less than 0.5 mm) of the five regions that are touched on by a second finger among the three fingers, as the touch information, in the memory 160, and may store the maximum width range (for example, a range of 1 mm to 1.5 mm or more) and the minimum width range (for example, 0.3 mm to less than 0.5 mm) of the five regions that are touched on by a third finger among the three fingers, as the touch information, in the memory 160. The controller 180 may set (recognize) as the grip pattern the touch information (the maximum width range and the minimum width range as the touch information) that is stored in the memory 160. The maximum width range and the minimum width range vary depending on a size of the user's finger.

The controller 180 pre-sets the grip pattern and then determines whether the touch input is received (S92). For example, the controller 180 determines whether the bezel region of the touch screen is touched on by the user.

The controller 180 decides (determines) whether the touch information (the maximum width and the minimum width or the maximum width range and the minimum width range) corresponding to the received touch input is the same as, or is similar to the grip pattern (S93).

When the touch information (the maximum width and the minimum width) corresponding to the received touch input is the same as or similar to the grip pattern, the controller 180 effectively prevents the touch-caused malfunction of the touch screen by blocking the touch information corresponding to the touch input (S94). When the maximum width of the touch region corresponding to the received touch input falls within the maximum width range corresponding to the grip pattern and the minimum width of the touch region corresponding to the received touch input falls within the minimum width range corresponding to the grip pattern, the controller 180 may prevent the touch-caused malfunction of the touch screen by blocking the touch information corresponding to the touch input.

When the touch information (the maximum width and the minimum width) corresponding to the received touch input is not the same as or is not similar to the grip pattern, the controller 180 outputs the touch information corresponding to the touch input (S95). For example, when the touch information (the maximum width and the minimum width) corresponding to the received touch input is different from the grip pattern, the controller 180 outputs the touch information corresponding to the touch input to the touch control unit. When the maximum width of the touch region corresponding to the received touch input does not fall within the maximum width range corresponding to the grip pattern or the minimum width of the touch region corresponding to the received touch input does not fall within the minimum width range corresponding to the grip pattern, the controller 180 outputs the touch information corresponding to the touch input to the touch control unit.

Therefore, in the device for controlling the mobile terminal according to the ninth embodiment of the present invention and the method of controlling the mobile terminal, when the grip pattern with respect to the touch screen is pre-set and the maximum width and the minimum width of the touch region corresponding to the touch input are the same or are similar to the grip pattern, the touch-caused malfunction that occurs because when the user grips the mobile terminal 100 a specific region of the touch screen is touched on is effectively prevented by blocking the touch information corresponding to the touch input.

A device for controlling a mobile terminal according to a tenth embodiment of the present invention, which is capable of preventing a touch-caused malfunction that occurs because when the user grips the mobile terminal a specific region of a touch screen is touched on, and a method of controlling the mobile terminal are described below.

Figure 24:
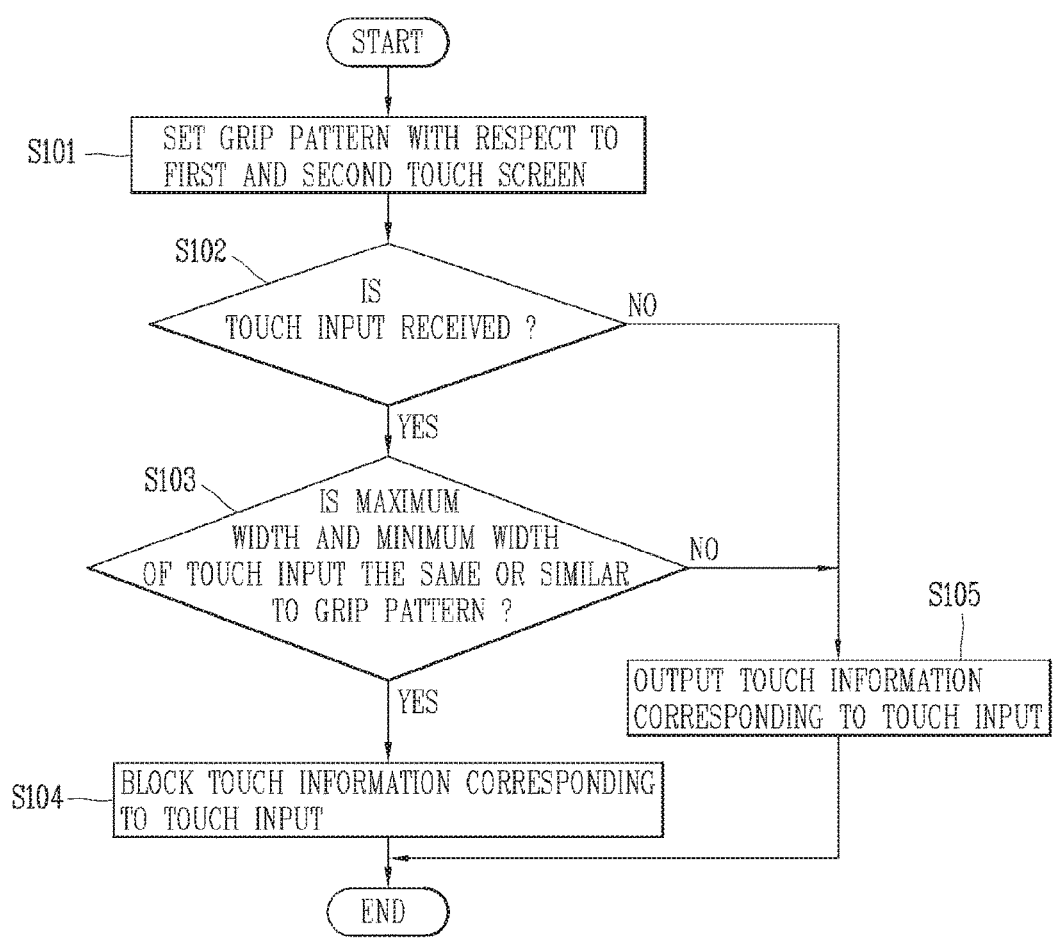
FIG. 24 is a flowchart illustrating a method of controlling a mobile terminal according to a tenth embodiment of the present invention.

FIG. 24 is a flowchart illustrating the method of controlling the mobile terminal 100 according to the tenth embodiment of the present invention.

First, when a grip pattern setting mode is selected by the user, the controller 180 displays a grip pattern setting screen for setting a grip pattern on the display unit 151. When the grip pattern setting mode is selected by the user, the controller 180 displays (reproduces) on the display unit 151 information that requests the user to grip the mobile terminal 100 a pre-set number of times (for example, one time to five times or more) in order to set (store) the grip pattern including the maximum widths and the minimum widths (or the maximum width range and the minimum width range) of the regions of the touch screen, which are touched on when the user grips the mobile terminal 100, and a moving image sample in which the mobile terminal 100 is gripped and released. There, the user can easily perform a grip pattern setting process while viewing the moving image sample.

The controller 180 sets the grip pattern through the grip pattern setting mode (S101).

Figure 25:
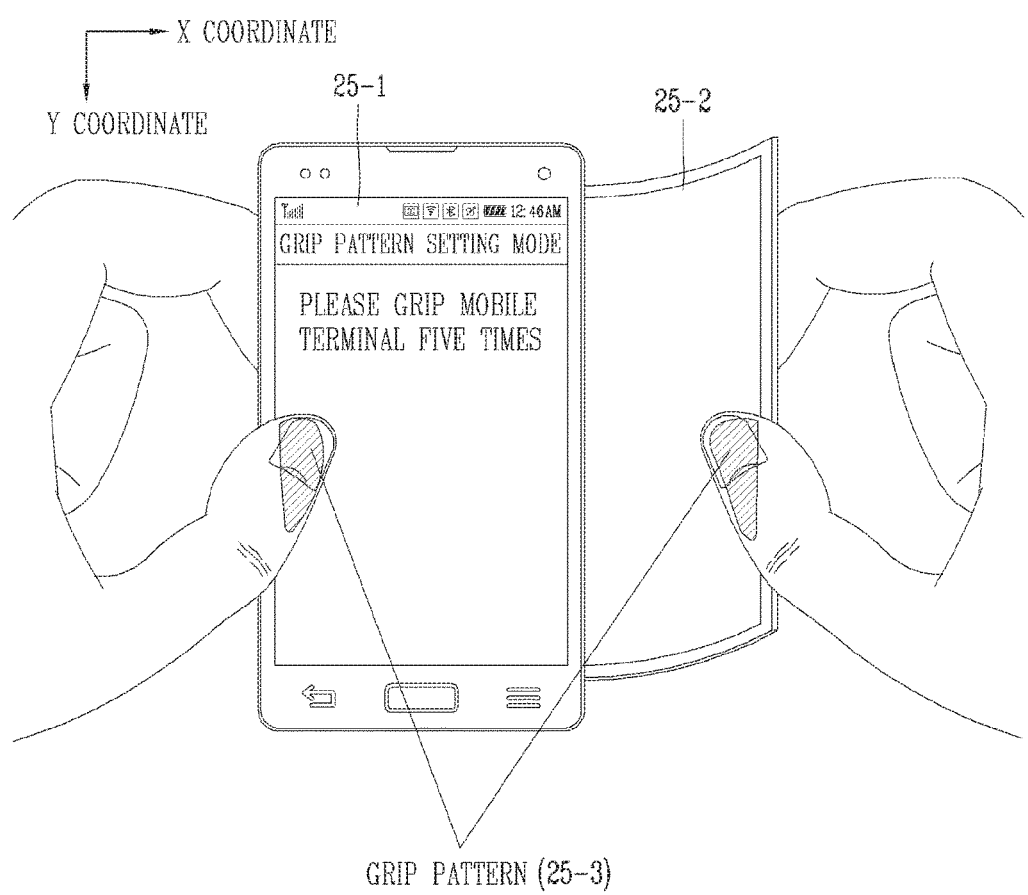
FIG. 25 is a diagram illustrating a grip pattern according to the tenth embodiment of the present invention.

FIG. 25 is a diagram illustrating the grip pattern according to the tenth embodiment of the present invention.

As illustrated in FIG. 25, the touch screen is configured to include a first touch screen 25-1 that is applied to a first display unit 151 and a second touch screen 25-2 that is applied to a flexible display. The flexible display is laterally inserted into a space within the lateral side of the mobile terminal 100 or is drawn outside. The touch screen is configured to include the first touch screen and the second touch screen that are applied to a dual display unit and the dual display unit is a folder type (bendable).

When the user grips the mobile terminal 100 in the grip pattern setting mode, the controller 180 sets (recognizes) as a grip pattern 25-3 the maximum widths and the minimum widths (or the maximum width range and the minimum width range) of the regions of the first and second touch screens, which are touched on when the user grips the mobile terminal 100. For example, when the first bezel region (for example, the left side region of the bezel) of the first touch screen 25-1 is touched on by a thumb on the user's left hand and the second bezel region (for example, the right side region of the bezel) of the second touch screen 25-2 is touched on by a thumb on the user's right hand, the controller 180 sets (recognizes) the maximum width and the minimum width (or the maximum width range and the minimum width range) of the first bezel region and the maximum widths and the minimum widths (or the maximum width range and the minimum width range) of the touched-on regions of the second bezel region. When the users grips the dual display of the mobile terminal 100, the first bezel region is single-touched and the second bezel region also is single-touched. That is, the controller 180 sets as information on the grip pattern 25-3 the touch information (the maximum width and the minimum width, or the maximum width range and the minimum width range) on the touched-on single region of the first bezel region, and the touch information (the maximum width and the minimum width, or the maximum width range and the minimum width range) on the touched-on single region of the second bezel region.

If the user grips the mobile terminal 100 a pre-set number of times (for example, five times) in the grip pattern setting mode, when the first bezel region is assumed to be touched on five times, the controller 180 stores the maximum widths and the minimum widths (or the maximum width range and the minimum width range) of the five touched-on regions, as the touch information, in the memory 160.

If the user grips the mobile terminal 100 a pre-set number of times (for example, five times) in the grip pattern setting mode, when the second bezel region is assumed to be touched on five times, the controller 180 stores the maximum widths and the minimum widths (or the maximum width range and the minimum width range) of the five touched-on regions, as the touch information, in the memory 160. The controller 180 sets (recognizes) the touch information (the maximum widths and the minimum widths, or the maximum width range and the minimum width range) that is stored in the memory 160, as the grip pattern.

The controller 180 pre-sets the grip pattern and then determines whether the touch input is received (S102). For example, the controller 180 determines whether the bezel region of the touch screen is touched on by the user.

The controller 180 decides (determines) whether the touch information (the maximum width and the minimum width or the maximum width range and the minimum width range) corresponding to the received touch input is the same as, or is similar to the grip pattern (S103).

When the touch information (the maximum width and the minimum width) corresponding to the received touch input is the same as or similar to the grip pattern, the controller 180 effectively prevents the touch-caused malfunction of the touch screen by blocking the touch information corresponding to the touch input (S104). When the maximum width of the touch region corresponding to the received touch input falls within the maximum width range corresponding to the grip pattern and the minimum width of the touch region corresponding to the received touch input falls within the minimum width range corresponding to the grip pattern, the controller 180 may prevent the touch-caused malfunction of the touch screen by blocking the touch information corresponding to the touch input.

When the touch information (the maximum width and the minimum width) corresponding to the received touch input is not the same as or is not similar to the grip pattern, the controller 180 outputs the touch information corresponding to the touch input (S105). For example, when the touch information (the maximum width and the minimum width) corresponding to the received touch input is different from the grip pattern, the controller 180 outputs the touch information corresponding to the touch input to the touch control unit. When the maximum width of the touch region corresponding to the received touch input does not fall within the maximum width range corresponding to the grip pattern or the minimum width of the touch region corresponding to the received touch input does not fall within the minimum width range corresponding to the grip pattern, the controller 180 outputs the touch information corresponding to the touch input to the touch control unit.

When the mobile terminal 100 is in a state of being gripped by the user, the controller 180 pre-sets as the grip pattern the maximum width and the minimum width (or the maximum width range and the minimum width range) of the touch region corresponding to the touch input with respect to the first bezel region 15-1 to the fourth bezel region 15-4.

The controller 180 may detect the maximum width and the minimum width of the touch region corresponding to the touch input with respect to the first bezel region 15-1 to the fourth bezel region 15-4, and when the detected maximum width and minimum width are the same or are similar to the grip pattern, may effectively prevent the touch-caused malfunction of the touch screen by blocking the touch information corresponding to the touch input.

The controller 180 may detect the maximum width and the minimum width of the touch region corresponding to the touch input with respect to the first bezel region 15-1 to the fourth bezel region 15-4, and when the detected maximum width falls within the maximum width range corresponding to the grip pattern and the minimum width of the touch region corresponding to the received touch input falls within the minimum width range corresponding to the grip pattern, may prevent the touch-caused malfunction of the touch screen by blocking the touch information corresponding to the touch input.

Therefore, in the device for controlling the mobile terminal according to the tenth embodiment of the present invention and the method of controlling the mobile terminal, when the grip pattern with respect to the first and second touch screens is preset and the touch input is the same as or similar to the grip pattern, the touch-caused malfunction that occurs because when the user grips the mobile terminal 100 a specific region of the touch screen is touched on is effectively prevented by blocking the touch information corresponding to the touch input.

As described above, in the device for controlling the mobile terminal according to the embodiments of the present invention and the method of controlling the mobile terminal, when the touch input continues to be received for the reference time for which the state in which the mobile terminal is gripped by the user is recognized, the touch-caused malfunction that occurs because when the user grips the mobile terminal the bezel region of the touch screen is touched on is prevented by blocking the touch information corresponding to the touch input.

In the device for controlling the mobile terminal according to the embodiments of the present invention and the method of controlling the mobile terminal, when the amount of change in coordinates corresponding to the touch input is equal to or less than the reference amount of change for the reference time, the touch-caused malfunction that occurs because when the user grips the mobile terminal the bezel region of the touch screen is touched on is effectively prevented by blocking the touch information corresponding to the touch input.

In the device for controlling the mobile terminal according to the embodiments of the present invention and the method of controlling the mobile terminal, when the amount of change in coordinates corresponding to the touch input is equal to or less than the reference amount of change for the reference time, and the touch area corresponding to the touch input is equal to or more than the reference area, the touch-caused malfunction that occurs because when the user grips the mobile terminal the bezel region of the touch screen is touched on is effectively prevented by blocking the touch information corresponding to the touch input.

In the device for controlling the mobile terminal according to the embodiments of the present invention and the method of controlling the mobile terminal, when the grip pattern with respect to the touch screen is pre-set and the touch input is the same as or similar to the grip pattern, the touch-caused malfunction that occurs because when the user grips the mobile terminal a specific region of the touch screen is touched on is effectively prevented by blocking the touch information corresponding to the touch input.

In the device for controlling the mobile terminal according to the embodiments of the present invention and the method of controlling the mobile terminal, when the grip pattern with respect to the first and second touch screens is pre-set and the touch input is the same as or similar to the grip pattern, the touch-caused malfunction that occurs because when the user grips the mobile terminal a specific region of the touch screen is touched on is effectively prevented by blocking the touch information corresponding to the touch input.

In the device for controlling the mobile terminal according to the embodiments of the present invention and the method of controlling the mobile terminal, the touch-caused malfunction is prevented which occurs because a specific region of the touch screen is touched on when the user grips the mobile terminal 100 including the flexible display (including the touch screen) that extends from the front side of the mobile terminal 100 to the lateral side.

In the device for controlling the mobile terminal according to the embodiments and the method of controlling the mobile terminal, the touch-caused malfunction that occurs because when the user grips the mobile terminal the bezel region of the touch screen is touched on is prevented by blocking the touch information corresponding to the touch input, based on the width of the touch region (the touch area) corresponding to the touch input with respect to the bezel region of the touch screen.

In the device for controlling the mobile terminal according to the embodiments and the method of controlling the mobile terminal, the touch-caused malfunction that occurs because when the user grips the mobile terminal the bezel region of the touch screen is touched on is prevented by blocking the touch information corresponding to the touch input, based on the width of the touch region (the touch area) corresponding to the touch input with respect to the bezel region of the touch screen and on the speed with respect to the distance from the touch starting point to the touch ending point.

In the device for controlling the mobile terminal according to the embodiments and the method of controlling the mobile terminal, when the grip pattern with respect to the touch screen is pre-set and the maximum width and the minimum width of the touch region corresponding to the touch input are the same or are similar to the grip pattern, the touch-caused malfunction that occurs because when the user grips the mobile terminal a specific region of the touch screen is touched on is effectively prevented by blocking the touch information corresponding to the touch input.

In the device for controlling the mobile terminal according to the embodiments of the present invention and the method of controlling the mobile terminal, when the grip pattern with respect to the first and second touch screens is pre-set and the touch input is the same as or similar to the grip pattern, the touch-caused malfunction that occurs because when the user grips the mobile terminal a specific region of the touch screen is touched on is effectively prevented by blocking the touch information corresponding to the touch input.

The configuration and the method of the embodiments according to the present invention, described above, are not applied in a limiting manner, but all of or some of the embodiments may be selectively combined with each other to create various modifications to the embodiments.

It will also be apparent to those skilled in the art that various modifications and variations can be made in the present invention without departing from the spirit or scope of the invention. Thus, it is intended that the present invention cover modifications and variations of this invention provided they come within the scope of the appended claims and their equivalents.

The invention claimed is:

1. A device for controlling a mobile terminal, the device comprising:
a display that displays an image;
a touch sensor that detects a touch input with respect to a bezel region of a touch screen of the display; and
a controller that:
determines whether the touch input is received for reference time for which a state in which the mobile terminal is gripped by a user is recognized;
outputs touch information corresponding to the touch input when the touch input is received for less than the reference time; and
blocks touch information corresponding to the touch input based on a maximum width and a minimum width of a touch region corresponding to the touch input when the touch input is received for at least the reference time, wherein the touch information is blocked when a difference between the maximum width and the minimum width is equal to or greater than a pre-set reference value, and
wherein the controller comprises:
a processor that generates a control signal for blocking the touch information; and
a switch that blocks the touch information based on the control signal.

2. The device of claim 1, wherein the controller detects an amount of change in coordinates corresponding to the touch input with respect to the bezel region and blocks the touch information corresponding to the touch input, based on the detected amount of change.

3. The device of claim 2, wherein when the detected amount of change is equal to or less than a reference amount of change for the reference time, the controller blocks the touch information corresponding to the touch input.

4. The device of claim 3, wherein when the detected amount of change is equal to or less than the reference amount of change for the reference time and a touch area corresponding to the touch input is equal to or more than a reference area, the controller blocks the touch information corresponding to the touch input.

5. The device of claim 1, wherein the controller pre-sets a grip pattern with respect to the touch screen and blocks the touch information corresponding to the touch input when the touch input is same as or similar to the pre-set grip pattern.

6. The device of claim 5, wherein the controller sets a touched-on region of the touch screen as the grip pattern in a grip pattern setting mode selected by a user input.

7. The device of claim 6, wherein the grip pattern includes a touched-on single region of a first bezel region of the touch screen and touched-on multi-regions of a second bezel of the touch screen, and the first bezel region and the second bezel region are formed in a position on the touch screen, in which the first bezel region and the second bezel region face each other.

8. The device of claim 1, wherein the controller pre-sets a grip pattern with first and second touch screens and blocks the touch information corresponding to the touch input when the touch input is same as or similar to the pre-set grip pattern.

9. The device of claim 8, wherein any one of the first and second touch screens is a touch screen that is applied to a flexible display.

10. The device of claim 9, wherein the controller pre-sets touch information on a touched-on first single region of a bezel region of the first touch screen and touch information on a touched-on second single region of a bezel region of the second touch screen as the grip pattern.

11. The device of claim 1, wherein the controller blocks the touch information corresponding to the touch input when the touch input is received for at least the reference time and when an amount of change in coordinates corresponding to the touch input is equal to or less than a reference amount of change.

12. A device of claim 1, wherein:
the touch screen is a touch screen that extends from a front side of the mobile terminal to a lateral side of the mobile terminal; and
the controller blocks the touch information corresponding to the touch input when the touch input with respect to at least one or more regions among a first bezel region located at a left side of the front side, a second bezel region located at a right side of the front side, a third bezel region located at a left lateral side of the mobile terminal, and a fourth bezel located at a right lateral side of the mobile terminal is received for at least the reference time and when an amount of change in coordinates corresponding to the touch input is equal to or less than a reference amount of change.

13. The device of claim 1, wherein the controller blocks the touch information corresponding to the touch input when the maximum width is equal to or greater than a value that corresponds to the minimum width multiplied by a pre-set number.

14. A method of controlling a mobile terminal, the method comprising:
displaying an image on a display;
detecting, by a controller, a touch input with respect to a bezel region of a touch screen of the display;
determining, by the controller, whether the touch input is received for reference time for which a state in which the mobile terminal is gripped by a user is recognized;
outputting, by the controller, touch information corresponding to the touch input when the touch input is received for less than the reference time; and
blocking, by the controller, touch information corresponding to the touch input based on a maximum width and a minimum width of a touch region corresponding to the touch input when the touch input is received for at least the reference time, wherein the touch information is blocked when a difference between the maximum width and the minimum width is equal to or greater than a pre-set reference value, and
wherein blocking the touch information comprises:
generating, by a processor of the controller, a control signal for blocking the touch information; and
blocking, by a switch of the controller, the touch information based on the control signal.

15. The method of claim 14, further comprising:
detecting an amount of change in coordinates corresponding to the touch input with respect to the bezel region of the touch screen; and
blocking the touch information corresponding to the touch input when the touch input continues is received for at least the reference time and when the detected amount of change is equal to or less than a reference amount of change.

16. The method of claim 14, wherein the touch screen is a touch screen that extends from a front side of the mobile terminal to a lateral side of the mobile terminal, the method further comprising:
blocking the touch information corresponding to the touch input when the touch input with respect to at least one or more regions among a first bezel region located at a left side of the front side of the mobile terminal, a second bezel region located at a right side of the front side, a third bezel region located at a left lateral side of the mobile terminal, and a fourth bezel located at a right lateral side of the mobile terminal is received for at least the reference time and when an amount of change in coordinates corresponding to the touch input is equal to or less than a reference amount of change.

* * * * *